United States Patent
Kanna et al.

(10) Patent No.: US 12,345,850 B2
(45) Date of Patent: Jul. 1, 2025

(54) LAMINATE AND METHOD FOR MANUFACTURING LAMINATE

(71) Applicant: FUJIFILM Corporation, Tokyo (JP)

(72) Inventors: Shinichi Kanna, Shizuoka (JP); Keigo Ueki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/596,669

(22) Filed: Mar. 6, 2024

(65) Prior Publication Data

US 2024/0230952 A1   Jul. 11, 2024

Related U.S. Application Data

(63) Continuation of application No. PCT/JP2022/033671, filed on Sep. 8, 2022.

(30) Foreign Application Priority Data

Sep. 16, 2021   (JP) .................... 2021-151493

(51) Int. Cl.
*G02B 1/00*   (2006.01)
*C08J 5/18*   (2006.01)
(Continued)

(52) U.S. Cl.
CPC ............... *G02B 1/002* (2013.01); *C08J 5/18* (2013.01); *C08K 5/3432* (2013.01);
(Continued)

(58) Field of Classification Search
CPC ......... G02B 1/002; C08J 5/18; C08J 2333/14; C08K 5/3432; C08K 5/3447; C08K 5/3472
(Continued)

(56) References Cited

U.S. PATENT DOCUMENTS 10,903,579 B2   1/2021   Suzuki
2003/0165704 A1*   9/2003   Hayes ................... F21V 7/28
                                                           428/522

(Continued)

FOREIGN PATENT DOCUMENTS

JP   2005099419   4/2005
JP   2006243403   9/2006
(Continued)

OTHER PUBLICATIONS

JP 2015-049277 A (Year: 2015).*
(Continued)

*Primary Examiner* — Betelhem Shewareged
(74) *Attorney, Agent, or Firm* — JCIPRNET

(57) ABSTRACT

The present invention provides a laminate capable of suppressing corrosion of a metal pattern serving as a resonator with respect to electromagnetic waves in a terahertz band, and a method for manufacturing a laminate. The laminate of the present invention includes a dielectric film, a metal pattern serving as a resonator with respect to electromagnetic waves in a terahertz band, which is disposed on at least one surface side of the dielectric film, and an organic film in which a moisture permeability under an environment of a temperature of 40° C. and a relative humidity of 90% is 3000 $g/(m^2 \cdot 24\ hr)$ or less, which is disposed on the metal pattern.

20 Claims, 3 Drawing Sheets

(51) Int. Cl.
 *C08K 5/3432* (2006.01)
 *C08K 5/3447* (2006.01)
 *C08K 5/3472* (2006.01)

(52) U.S. Cl.
 CPC .......... *C08K 5/3447* (2013.01); *C08K 5/3472* (2013.01); *C08J 2333/14* (2013.01)

(58) Field of Classification Search
 USPC ....................................................... 428/201
 See application file for complete search history.

(56) References Cited

U.S. PATENT DOCUMENTS

| | | | | |
|---|---|---|---|---|
| 2006/0199915 | A1* | 9/2006 | Izumi | G03F 7/0395 |
| 2015/0152304 | A1* | 6/2015 | Shimada | D06M 15/256 |
| | | | | 427/209 |
| 2016/0209567 | A1 | 7/2016 | Suzuki | |
| 2024/0230952 | A1* | 7/2024 | Kanna | H01P 11/00 |

FOREIGN PATENT DOCUMENTS

| | | |
|---|---|---|
| JP | 2015049277 | 3/2015 |
| JP | 2015106067 | 6/2015 |
| JP | 2017157975 | 9/2017 |

OTHER PUBLICATIONS

"International Search Report (Form PCT/ISA/210) of PCT/JP2022/033671", mailed on Nov. 22, 2022, with English translation thereof, pp. 1-6.

"Written Opinion of the International Searching Authority (Form PCT/ISA/237) of PCT/JP2022/033671", mailed on Nov. 22, 2022, with English translation thereof, pp. 1-8.

Yasuda, Takao, "Testing Methods and Evaluation Results for Dynamic Characteristics of Plastic Materials", Japan Plastics, vol. 51, Jun. 2000, with partial English translation thereof, pp. 1-12.

* cited by examiner

LAMINATE AND METHOD FOR MANUFACTURING LAMINATE

CROSS-REFERENCE TO RELATED APPLICATIONS

This application is a Continuation of PCT International Application No. PCT/JP2022/033671 filed on Sep. 8, 2022, which claims priority under 35 U.S.C. § 119(a) to Japanese Patent Application No. 2021-151493 filed on Sep. 16, 2021. The above applications are hereby expressly incorporated by reference, in their entirety, into the present application.

BACKGROUND OF THE INVENTION

1. Field of the Invention

The present invention relates to a laminate and a method for manufacturing a laminate.

2. Description of the Related Art

A metamaterial is capable of inducing an effective change in refractive index by artificially arranging aggregates of microstructures smaller than a wavelength of an electromagnetic wave and utilizing a characteristic optical response exhibited by the aggregates of the microstructures. In a case where such a metamaterial can be formed on a micron order-thick film, the metamaterial can be applied to an optical element for terahertz waves (electromagnetic waves with a frequency of 0.1 to 10 THz (wavelength of 30 to 3000 µm)).

JP2017-157975A proposes a sheet-type metamaterial including a film-like dielectric substrate, a first wire array composed of a first cut wire made of metal, which is formed on one surface of the dielectric substrate, and a second wire array composed of a second cut wire made of metal, which is formed on the other surface of the dielectric substrate.

SUMMARY OF THE INVENTION

The present inventors have studied on characteristics of the sheet-type metamaterial disclosed in JP2017-157975A, and have found that corrosion easily occurs in the cut wire made of metal, which constitutes the wire array disposed on the dielectric substrate. In a case where such corrosion occurs, the effective change in refractive index occurs, and as a result, the function as a metamaterial may be deteriorated.

An object of the present invention is to provide a laminate capable of suppressing corrosion of a metal pattern serving as a resonator with respect to electromagnetic waves in a terahertz band.

Another object of the present invention is to provide a method for manufacturing a laminate.

As a result of intensive studies on the above-described objects, the present inventors have found that the above-described objects can be achieved by the following configurations.

(1) A laminate comprising:
a dielectric film;
a metal pattern serving as a resonator with respect to electromagnetic waves in a terahertz band, which is disposed on at least one surface side of the dielectric film; and
an organic film in which a moisture permeability under an environment of a temperature of 40° C. and a relative humidity of 90% is 3000 g/(m$^2$·24 hr) or less, which is disposed on the metal pattern.

(2) The laminate according to (1),
in which the organic film contains a heterocyclic compound.

(3) The laminate according to (1) or (2),
in which the organic film contains a polymer having an acid value of 20 mgKOH/g or less.

(4) The laminate according to any one of (1) to (3),
in which the organic film is formed of a curable composition, and the curable composition contains a blocked isocyanate.

(5) A laminate comprising:
a dielectric film;
a first metal pattern composed of a plurality of first metal structures, which is disposed on one surface side of the dielectric film;
a first organic film in which a moisture permeability under an environment of a temperature of 40° C. and a relative humidity of 90% is 3000 g/(m$^2$·24 hr) or less, which is disposed on the first metal pattern;
a second metal pattern composed of a plurality of second metal structures, which is disposed on the other surface side of the dielectric film; and
a second organic film in which a moisture permeability under the environment of a temperature of 40° C. and a relative humidity of 90% is 3000 g/(m$^2$·24 hr) or less, which is disposed on the second metal pattern,
in which the first metal pattern and the second metal pattern form a resonator with respect to electromagnetic waves in a terahertz band.

(6) The laminate according to (5),
in which, in a case where the laminate is seen in a plan view, at least a part of the first metal structure included in the first metal pattern and at least a part of the second metal structure included in the second metal pattern are arranged to be overlapped with each other.

(7) The laminate according to (5) or (6),
in which the first organic film and the second organic film contain a heterocyclic compound.

(8) The laminate according to any one of (5) to (7),
in which the first organic film and the second organic film contain a polymer having an acid value of 20 mgKOH/g or less.

(9) The laminate according to any one of (5) to (8),
in which the first organic film and the second organic film are formed of a curable composition, and the curable composition contains a blocked isocyanate.

(10) An optical element comprising:
the laminate according to any one of (1) to (9).

(11) A method for manufacturing a laminate, comprising:
a step 1A of bonding a film with a metal pattern, that includes a dielectric film and a metal pattern serving as a resonator with respect to electromagnetic waves in a terahertz band, which is disposed on at least one surface side of the dielectric film, to a transfer film including a temporary support and a curable composition layer to form a precursor film including the dielectric film, the metal pattern, the curable composition layer, and the temporary support in this order; and
a step 2A of subjecting the curable composition layer to a curing treatment to obtain an organic film in which a moisture permeability under an environment of a temperature of 40° C. and a relative humidity of 90% is 3000 g/(m$^2$·24 hr) or less, in which a step of peeling off the temporary support is further provided between the step 1A and the step 2A or after the step 2A.

(12) The method for manufacturing a laminate according to (11),
in which the organic film contains a heterocyclic compound.

(13) The method for manufacturing a laminate according to (11) or (12), in which the organic film contains a polymer having an acid value of 20 mgKOH/g or less.

(14) The method for manufacturing a laminate according to any one of (11) to (13),
in which the curable composition layer contains a blocked isocyanate.

(15) A method for manufacturing a laminate, comprising:
a step 1B of bonding a film with a metal pattern, that includes a dielectric film, a first metal pattern composed of a plurality of first metal structures, which is disposed on one surface side of the dielectric film, and a second metal pattern composed of a plurality of second metal structures, which is disposed on the other surface side of the dielectric film, where the first metal pattern and the second metal pattern form a resonator with respect to electromagnetic waves in a terahertz band, to a transfer film including a temporary support and a curable composition layer to form a precursor film including the temporary support, the curable composition layer, the first metal pattern, the dielectric film, the second metal pattern, the curable composition layer, and the temporary support in this order; and
a step 2B of subjecting the curable composition layers to a curing treatment to obtain organic films in which a moisture permeability under an environment of a temperature of 40° C. and a relative humidity of 90% is 3000 g/(m²·24 hr) or less,
in which a step 3B of peeling off the temporary supports is further provided between the step 1B and the step 2B or after the step 2B.

(16) The method for manufacturing a laminate according to (15),
in which, in a case where the film with a metal pattern is seen in a plan view, at least a part of the first metal structure included in the first metal pattern and at least a part of the second metal structure included in the second metal pattern are arranged to be overlapped with each other.

(17) The method for manufacturing a laminate according to (15) or (16),
in which the organic films contain a heterocyclic compound.

(18) The method for manufacturing a laminate according to any one of (15) to (17),
in which the organic films contain a polymer having an acid value of 20 mgKOH/g or less.

(19) The method for manufacturing a laminate according to any one of (15) to (18),
in which the curable composition layers contain a blocked isocyanate.

According to the present invention, an object is to provide a laminate capable of suppressing corrosion of a metal pattern serving as a resonator with respect to electromagnetic waves in a terahertz band.

In addition, according to the present invention, an object is to provide a method for manufacturing a laminate.

DESCRIPTION OF THE PREFERRED EMBODIMENTS

Figure 1:
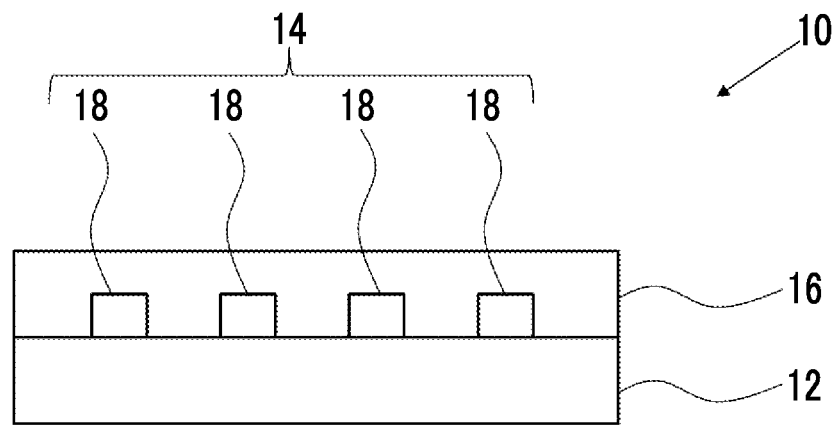
FIG. 1 is a schematic view showing an example of a layer configuration of a first embodiment of the laminate according to the present invention.

Hereinafter, the present invention will be described in detail.

The description of the configuration requirements described below is made on the basis of representative embodiments of the present invention, but it should not be construed that the present invention is limited to those embodiments.

Hereinafter, meaning of each description in the present specification will be explained.

In the present specification, the numerical ranges shown using "to" indicate ranges including the numerical values described before and after "to" as the lower limit value and the upper limit value.

In the numerical range described stepwise in the present specification, the upper limit value or the lower limit value described in a certain numerical range may be replaced with the upper limit value or the lower limit value of another numerical range described stepwise. In addition, regarding the numerical range described in the present specification, an upper limit value or a lower limit value described in a numerical value may be replaced with a value described in Examples.

In the present specification, the term "step" includes not only an independent step but also a step that cannot be clearly distinguished from other steps, as long as the intended purpose of the step is achieved.

In the present specification, unless otherwise specified, a weight-average molecular weight (Mw) and a number average molecular weight (Mn) are values obtained by a gel permeation chromatography (GPC) analysis apparatus and converted using polystyrene as a standard substance, with TSKgel GMHxL, TSKgel G4000HxL, or TSKgel G2000HxL (all product names manufactured by Tosoh Corporation) as a column, tetrahydrofuran (THF) as an eluent, and a differential refractometer as a detector. In the present specification, unless otherwise specified, a molecular weight of a compound having a molecular weight distribution is the weight-average molecular weight (Mw).

In the present specification, unless otherwise specified, a hue is a value measured by using a colorimeter (CR-221, manufactured by Konica Minolta, Inc.).

In the present specification, "(meth)acrylic" is a concept including both acrylic and methacrylic, and "(meth)acryloxy group" is a concept including both an acryloxy group and a methacryloxy group.

In the present specification, "alkali-soluble" means that the solubility in 100 g of aqueous solution of 1% by mass sodium carbonate at 22° C. is 0.1 g or more.

In the present specification, "water-soluble" means that the solubility in 100 g of water with a pH of 7.0 at a liquid temperature of 22° C. is 0.1 g or more. Therefore, for example, a water-soluble resin is intended to be a resin which satisfies the above-described solubility conditions.

In the present specification, a "solid content" of a composition refers to components which form a composition layer formed of the composition, and in a case where the composition includes a solvent (an organic solvent, water, and the like), the solid content means all components except the solvent. In addition, in a case where the components are components which form a composition layer, the components are considered to be solid contents even in a case where the components are liquid components.

A feature of the laminate according to the embodiment of the present invention is that an organic film exhibiting a predetermined moisture permeability is used. The present inventors have found for the first time that corrosion of a metal pattern consisting of a plurality of metal structures, causing a function as a metamaterial, occurs, and have found that the corrosion of the metal pattern can be suppressed by using the organic film having a predetermined moisture permeability in order to suppress the corrosion.

First Embodiment

A first embodiment of the laminate according to the present invention will be described with reference to the drawing.

A laminate 10 shown in FIG. 1 includes a dielectric film 12, a metal pattern 14, and an organic film 16 in this order. In FIG. 1, the metal pattern 14 is composed of a plurality of metal structures 18.

As will be described in detail later, the plurality of metal structures 18 constituting the metal pattern 14 can function as a resonator with respect to electromagnetic waves in a terahertz band Hereinafter, each member constituting the laminate will be described in detail.

<Dielectric Film>

As the dielectric film, a known dielectric film can be used.

The dielectric film is preferably an insulator which does not conduct electricity to a DC voltage.

A material constituting the dielectric film is not particularly limited, but is preferably a resin from the viewpoint of handleability and the like. That is, a dielectric resin film is preferable as the dielectric film.

Examples of the resin constituting the dielectric resin film include polyesters such as polyethylene terephthalate (PET) and polyethylene naphthalate (PEN), polyolefins such as polyethylene (PE), polypropylene (PP), polystyrene, ethylene vinyl acetate (EVA), cycloolefin polymer (COP), and cycloolefin copolymer (COC), vinyl resins, polycarbonate (PC), polyamide, polyimide, acrylic resins, and triacetyl cellulose (TAC). Among these, a cycloolefin polymer or a cycloolefin copolymer is preferable.

Examples of the cycloolefin polymer include cycloolefin polymers described in paragraphs 0052 to 0071 of JP4991170B.

A thickness of the dielectric film is not particularly limited, but is preferably 5 to 100 µm, more preferably 10 to 80 µm, and still more preferably 15 to 50 µm.

In a case where the thickness of the dielectric film is 5 µm or more, handleability is excellent, and in a case where the thickness thereof is 100 µm or less, the function of the metal pattern as a metamaterial is more easily exhibited.

In addition, variation in thickness of the dielectric film in an in-plane direction is preferably within 1 µm.

A transmittance of the dielectric film with respect to the terahertz wave is not particularly limited, but is preferably 75% or more, more preferably 85% or more, and still more preferably 95% or more.

The dielectric film may have a monolayer structure or a multilayer structure.

<Metal Pattern>

The metal pattern serves as a resonator with respect to electromagnetic waves in a terahertz band (electromagnetic waves with a frequency of 0.1 to 10 THz (wavelength of 30 to 3000 µm)). More specifically, the metal pattern consists of a plurality of metal structures, and the metal structures are resonators with respect to electromagnetic waves in the terahertz band.

A shape or a size of the metal structure is not particularly limited, but it is preferable that the metal structure has a shape in which, in a case where an electromagnetic wave in the terahertz band is incident on the laminate, a bias of a charge or a current is generated in the metal structure or between adjacent metal structures due to an interaction with an electric field or a magnetic field of the incident electromagnetic wave to induce a dielectric or magnetic response change, and has a size equal to or smaller than a wavelength of the incident electromagnetic wave. Such a metal pattern can function as a so-called metamaterial.

Figure 2:
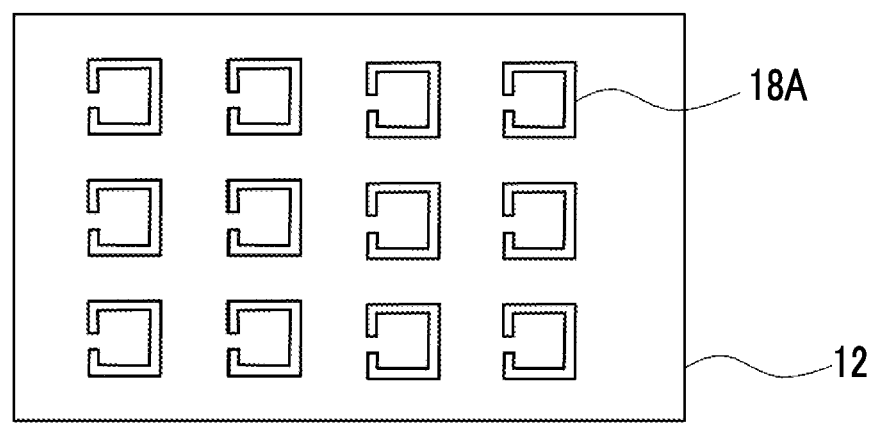
FIG. 2 is a schematic view showing an example of a metal structure.

The shape of the metal structure is not particularly limited, and examples thereof include a C shape, a U shape, a double ring shape, a V shape, an L shape, a lattice shape, a spiral shape, a square shape, a circular shape, and a cross shape. More specifically, for example, FIG. 2 illustrates an aspect in which a plurality of C-shaped metal structures 18A are arranged on the dielectric film 12.

The type of the metal constituting the metal structure is not particularly limited, and it is preferably gold, silver, platinum, copper, aluminum, or an alloy containing one or more of these metals, and more preferably silver or copper.

The size of the metal structure is not particularly limited as long as the metal structure resonates with the electromagnetic waves in the terahertz band, and the maximum length of the metal structure is preferably 1 to 3000 µm and more preferably 5 to 1000 µm.

The maximum length of the metal structure is the longest length in a case where a straight line is drawn from one end to the other end of the metal structure.

An arrangement position of the metal structure on the dielectric film is not particularly limited as long as it is an arrangement resonating with the electromagnetic waves in the terahertz band.

In addition, in a case where the laminate is applied as a sheet-type collimating lens for electromagnetic waves in a terahertz band, it is preferable that the metal structures are arranged such that a refractive index distribution in which a difference in refractive index of two times or more occurs with respect to the electromagnetic waves in the terahertz band is generated in the in-plane direction of the dielectric film.

In addition, the metal structures may be arranged on the dielectric film so as to form a periodic structure in which an amount of phase shift the electromagnetic waves in the terahertz band continuously increases or decreases from a center of the laminate toward an outer region. In a case where the metal structures are arranged in this manner, the metal structures may be arranged in three or more regions arranged concentrically from the center of the laminate. In this case, a change in width of a diameter of each concentric circle is preferably 10 to 200 µm.

FIG. 1 shows an aspect in which the metal pattern is disposed only on one surface side of the dielectric film, but the present invention is not limited to this aspect, and the metal pattern may be disposed on both surfaces of the dielectric film.

<Organic Film>

The organic film has a role for preventing corrosion of the above-described metal pattern. The organic film is disposed on the metal pattern so as to cover the metal pattern.

The organic film is a film in which a moisture permeability (water vapor transmission rate) under an environment of a temperature of 40° C. and a relative humidity of 90% is 3000 g/(m²·24 hr) or less.

From the viewpoint that the corrosion of the metal pattern is further suppressed (hereinafter, also simply referred to as "the effect of the present invention is more excellent"), the above-described moisture permeability is preferably 2000 g/(m²·24 hr) or less, and more preferably 1000 g/(m²·24 hr) or less. The lower limit thereof is not particularly limited, but is 150 g/(m²·24 hr) or more in many cases, and 250 g/(m²·24 hr) or more in more cases.

A method of measuring the above-described moisture permeability is as follows.

A measurement sample in which five layers of the organic film are laminated is prepared and left to stand for 24 hours under measurement conditions of a temperature of 40° C. and a relative humidity of 90%, and then the moisture permeability is measured under the measurement conditions according to JIS Z 0208. The obtained measured value is multiplied by 5 to calculate a moisture permeability per layer.

The above-described operation is performed on five measurement samples to obtain values of the moisture permeability per layer, and these numerical values are arithmetically averaged to obtain the moisture permeability in the present invention.

Examples of a method of producing the measurement sample in which five layers of the organic film are laminated include a method of, using a transfer film including a curable composition layer to be the organic film, laminating the curable composition layer five times, and subjecting the obtained laminated to a curing treatment to produce the measurement sample in which five layers of the organic film are laminated, which will be described later in Examples.

A thickness of the organic film is not particularly limited, but from the viewpoint that transmission characteristics of the electromagnetic wave are not impaired, it is preferably 20 µm or less, more preferably 10 µm or less, and still more preferably 5 µm or less. The lower limit thereof is not particularly limited, but is 0.5 µm or more in many cases.

A material contained in the organic film is not particularly limited, but it is preferable that the organic film contains a polymer.

Examples of the polymer include a saturated or unsaturated polyester resin, a (meth)acrylic resin, an acrylic urethane resin, a polyester acrylate resin, a polyurethane acrylate resin, an epoxy acrylate resin, an urethane resin, an epoxy resin, a vinyl resin, a polycarbonate resin, a cellulose resin, an acetal resin, a polyethylene resin, a polystyrene resin, a polyamide resin, a polyimide resin, a melamine resin, a phenolic resin, and a silicone resin.

Examples of the polymer which may be contained in the organic film also include a binder polymer which may be contained in a curable composition layer described later and a polymer of a polymerizable compound described in detail later, and details thereof will be described later.

In a case where the organic film is formed of the curable composition layer described later and the polymer contained in the curable composition layer includes a reactive group, a reactant of the polymer is contained in the organic film.

The polymer contained in the organic film may or may not have an acid group, and in a case where the polymer has an acid group, an acid value of the polymer is not particularly limited and is preferably 1000 mgKOH/g or less, more preferably 200 mgKOH/g or less, and still more preferably 20 mgKOH/g or less. In a case where the polymer has an acid group, the lower limit of the acid value is not particularly limited and is more than 0 mgKOH/g in many cases.

The acid value of the polymer is a value measured according to the method described in JIS K 0070:1992.

In a case the organic film contains a polymer, a content of the polymer is preferably 10% to 90% by mass, more preferably 20% to 80% by mass, and still more preferably 30% to 70% by mass with respect to the total mass of the organic film.

The organic film preferably contains a heterocyclic compound. In a case where the organic film contains a heterocyclic compound, the corrosion of the metal pattern is further prevented.

Examples of the heterocyclic compound which may be contained in the organic film include heterocyclic compounds which may be contained in the curable composition layer described later, and details thereof will be described later.

The organic film may contain only one kind of heterocyclic compound or may contain two or more kinds of heterocyclic compounds.

In a case where the organic film contains a heterocyclic compound, a content of the heterocyclic compound is preferably 0.01% to 20% by mass, and more preferably 0.1% to 10% by mass with respect to the total mass of the organic film.

The organic film may contain a component (for example, a surfactant and the like) other than the polymer and the heterocyclic compound described above.

(Other Layers)

The above-described laminate may include configurations other than the dielectric film, the metal pattern, and the organic film.

In addition, a metal pattern and an organic film may be repeatedly laminated on the dielectric film.

<Method for Manufacturing Laminate>

A method for manufacturing the above-described laminate is not particularly limited, and the laminate can be manufactured by a known method.

Examples thereof include a method in which a predetermined organic film is bonded on a metal pattern of a film with a metal pattern (hereinafter, also simply referred to as "film A with a metal pattern"), the film including a dielectric film and a metal pattern serving as a resonator with respect to electromagnetic waves in a terahertz band, which is disposed on at least one surface side of the dielectric film; and a method of forming an organic film by applying a curable composition onto the film A with a metal pattern and performing a curing treatment thereon as necessary; and a method of using a transfer film including a temporary support and a curable composition layer containing predetermined components.

As the method of using a transfer film, a method including a step 1A of bonding the film A with a metal pattern to a transfer film including a temporary support and a curable composition layer to form a precursor film including the dielectric film, the metal pattern, the curable composition layer, and the temporary support in this order and a step 2A of subjecting the curable composition layer to a curing treatment to obtain the above-described organic film, in which a step 3A of peeling off the temporary support is further provided between the step 1A and the step 2A or after the step 2A, is preferable.

Hereinafter, the method of using a transfer film will be described in detail. A configuration of the transfer film itself will be described in detail later.

(Film A with Metal Pattern)

In the method of using a transfer film, the film A with a metal pattern, including a dielectric film and a metal pattern serving as a resonator with respect to electromagnetic waves in a terahertz band, which is disposed on at least one surface side of the dielectric film, is used.

A configuration of the metal pattern included in the film A with a metal pattern is the same as the configuration of the metal pattern in the laminate described above.

A method for manufacturing the above-described film A with a metal pattern is not particularly limited, and the film with a metal pattern can be manufactured by forming a metal layer on the dielectric film, disposing a predetermined resist pattern on the metal layer, etching away the metal layer not covered with the resist pattern, and peeling off the resist pattern.

(Step 1A)

The step 1A is a step of bonding the film A with a metal pattern to a transfer film including a temporary support and a curable composition layer to form a precursor film including the dielectric film, the metal pattern, the curable composition layer, and the temporary support in this order.

In this step, an exposed curable composition layer on the temporary support in the transfer film is brought into contact with and bonded to the film A with a metal pattern. By this bonding, the curable composition layer and the temporary support are arranged on the film A with a metal pattern.

In the above-described bonding, it is preferable that the above-described metal pattern and a surface of the above-described curable composition layer are pressure-bonded so as to be in contact with each other.

The above-described pressure-bonding method is not particularly limited, and known transfer methods and laminating methods can be used. Among these, it is preferable to laminate the surface of the curable composition layer on the dielectric film having the metal pattern, and apply pressure and heat by a roll or the like.

A known laminator such as a vacuum laminator and an auto-cut laminator can be used for the bonding.

(Step 2A)

The step 2A is a step of subjecting the curable composition layer to a curing treatment to obtain an organic film.

The curing treatment is appropriately selected according to the curable composition to be used, and in a case where the curable composition is a thermosetting composition, a heating treatment is selected, and in a case where the curable composition is a photocurable composition, an exposure treatment is exemplified. In addition, the exposure treatment and the heating treatment may be performed sequentially or simultaneously.

Conditions of the heating treatment are not particularly limited, and a heating temperature is preferably 100° C. to 200° C., more preferably 110° C. to 180° C., and still more preferably 120° C. to 170° C. A heating time is preferably 0.05 to 5 hours, more preferably 0.08 to 3 hours, and still more preferably 0.1 to 1 hour.

The exposure treatment may be in a form of carrying out exposure in a patterned manner. As necessary, a development treatment may be carried out in a case where the pattern exposure is carried out.

As a light source of the exposure, a light source can be appropriately selected as long as it can emit light at a wavelength region (for example, 365 nm or 405 nm) at which at least the curable composition can be cured. Among these, a main wavelength of exposure light for the exposure is preferably 365 nm. The main wavelength is a wavelength having the highest intensity.

Examples of the light source include various lasers, a light emitting diode (LED), an ultra-high pressure mercury lamp, a high pressure mercury lamp, and a metal halide lamp.

An exposure amount is preferably 5 to 200 mJ/cm$^2$ and more preferably 10 to 200 mJ/cm$^2$.

Suitable aspects of the light source, the exposure amount, and the exposing method used for the exposure are described in, for example, paragraphs [0146] and [0147] of WO2018/155193A, the contents of which are incorporated herein by reference.

(Step 3A)

The step 3A is a step of peeling off the temporary support between the step 1A and the step 2A or after the step 2A.

The peeling method is not particularly limited, and the same mechanism as the cover film peeling mechanism described in paragraphs [0161] and [0162] of JP2010-072589A can be used.

(Other Steps)

In a case where the pattern exposure is performed in the curing step, as necessary, a developing step may be performed. The developing step is a step of developing the exposed curable composition layer to form a pattern.

The above-described development of the curable composition layer can be performed using a developer.

As the developer, an alkali aqueous solution is preferable. Examples of an alkali compound which can be contained in the alkali aqueous solution include sodium hydroxide, potassium hydroxide, sodium carbonate, potassium carbonate, sodium hydrogen carbonate, potassium hydrogencarbonate, tetramethyl ammonium hydroxide, tetraethyl ammonium hydroxide, tetrapropyl ammonium hydroxide, tetrabutylammonium hydroxide, and choline (2-hydroxyethyltrimethylammonium hydroxide).

Examples of the development method include methods such as puddle development, shower development, spin development, and dip development.

Examples of the developer which is suitably used in the present disclosure include the developer described in paragraph [0194] of WO2015/093271A, and examples of the developing method which is suitably used include the developing method described in paragraph [0195] of WO2015/093271A.

A pattern formed by the above-described procedure (a cured film of the curable composition layer) is preferably achromatic. Specifically, in an L*a*b* color system, the a* value of the pattern is preferably −1.0 to 1.0, and the b* value of the pattern is preferably −1.0 to 1.0.

A step of exposing the pattern obtained by the above-described developing step (post-exposing step) and/or a step of heating (post-baking step) the pattern may be provided.

In a case where both of the post-exposing step and the post-baking step are included, it is preferable that the post-baking is performed after the post-exposure.

(Transfer Film)

The transfer film includes a temporary support and a curable composition layer disposed on the temporary support. By curing the curable composition layer, the above-described organic film is formed.

Hereinafter, first, the configuration of the transfer film will be described in detail.

(Temporary Support)

The temporary support is a member which supports the curable composition layer described later, and is finally removed by a peeling treatment.

The temporary support is preferably a film and more preferably a resin film. As the temporary support, a film which has flexibility and does not show significant deformation, contraction, or stretching under pressure or under pressure and heating can be used.

Examples of such a film include a polyethylene terephthalate film (for example, a biaxially stretching polyethylene terephthalate film), a cellulose triacetate film, a polystyrene film, a polyimide film, and a polycarbonate film.

Among these, as the temporary support, a biaxially stretching polyethylene terephthalate film is preferable.

In addition, it is preferable that the film used as the temporary support does not have deformation such as wrinkles or scratches.

From the viewpoint that exposure through the temporary support can be performed, the temporary support preferably has high transparency, and the transmittance at 365 nm is preferably 60% or more and more preferably 70% or more.

From the viewpoint of pattern formability during pattern exposure through the temporary support and transparency of the temporary support, it is preferable that a haze of the temporary support is small. Specifically, a haze value of the temporary support is preferably 2% or less, more preferably 0.5% or less, and still more preferably 0.1% or less.

From the viewpoint of the pattern forming properties during the pattern exposure through the temporary support and the transparency of the temporary support, it is preferable that the number of fine particles, foreign substances, and defects included in the temporary support is small. The number of fine particles, foreign substances, and defects having a diameter of 1 μm or more is preferably 50 pieces/10 mm² or less, more preferably 10 pieces/10 mm² or less, still more preferably 3 pieces/10 mm² or less, and particularly preferably 0 pieces/10 mm².

A thickness of the temporary support is not particularly limited, but from the viewpoint of ease of handling and general-purpose properties, it is preferably 5 to 200 μm, more preferably 10 to 150 μm, and still more preferably 10 to 50 μm.

From the viewpoint of imparting handleability, a layer (lubricant layer) containing fine particles may be provided on a surface of the temporary support. The lubricant layer may be provided on one surface of the temporary support, or on both surfaces thereof. A diameter of the particles contained in the lubricant layer can be 0.05 to 0.8 μm. In addition, a film thickness of the lubricant layer can be 0.05 to 1.0 μm.

Examples of the temporary support include a biaxial stretching polyethylene terephthalate film having a film thickness of 16 μm, a biaxial stretching polyethylene terephthalate film having a film thickness of 12 μm, and a biaxial stretching polyethylene terephthalate film having a film thickness of 9 μm.

A preferred aspect of the temporary support is described in, for example, paragraphs [0017] and [0018] of JP2014-085643A, paragraphs [0019] to [0026] of JP2016-027363A, paragraphs [0041] to [0057] of WO2012/081680A, and paragraphs [0029] to [0040] of WO2018/179370A, the contents of which are incorporated herein by reference.

(Curable Composition Layer)

The transfer film includes a curable composition layer. The above-described organic film can be formed by transferring the curable composition layer onto the metal pattern, and then performing the curing treatment.

The curable composition layer may be a thermosetting composition layer or a photocurable composition layer.

Hereinafter, components contained in the curable composition layer will be described in detail.

[Binder Polymer]

The curable composition layer may contain a binder polymer.

From the viewpoint of excellent alkali developability and film formability, examples of one suitable aspect of the binder polymer include a (meth)acrylic resin.

In the present specification, the (meth)acrylic resin means a resin having a constitutional unit derived from a (meth)acrylic compound. The content of the constitutional unit derived from a (meth)acrylic compound is preferably 50% by mass or more, more preferably 70% by mass or more, and still more preferably 90% by mass or more with respect to all constitutional units of the (meth)acrylic resin.

The (meth)acrylic resin may be composed of only the constitutional unit derived from a (meth)acrylic compound, or may have a constitutional unit derived from a polymerizable monomer other than the (meth)acrylic compound. That is, the upper limit of the content of the constitutional unit derived from a (meth)acrylic compound is 100% by mass or less with respect to all constitutional units of the (meth)acrylic resin.

Examples of the (meth)acrylic compound include (meth)acrylic acid, (meth)acrylic acid ester, (meth)acrylamide, and (meth)acrylonitrile.

Examples of the (meth)acrylic acid ester include (meth)acrylic acid alkyl ester, (meth)acrylic acid tetrahydrofurfuryl ester, (meth)acrylic acid dimethylaminoethyl ester, (meth)acrylic acid diethylaminoethyl ester, (meth)acrylic acid glycidyl ester, (meth)acrylic acid benzyl ester, 2,2,2-trifluoroethyl (meth)acrylate, and 2,2,3,3-tetrafluoropropyl (meth)acrylate, and (meth)acrylic acid alkyl ester is preferable.

Examples of the (meth)acrylamide include acrylamides such as diacetone acrylamide.

An alkyl group of the (meth)acrylic alkyl ester may be linear or branched. Specific examples thereof include (meth)acrylic acid alkyl esters having an alkyl group having 1 to 12 carbon atoms, such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, (meth)acrylic acid-2-ethylhexyl, nonyl (meth)acrylate, decyl (meth)acrylate, undecyl (meth)acrylate, and dodecyl (meth)acrylate.

As the (meth)acrylic acid ester, (meth)acrylic acid alkyl ester having an alkyl group having 1 to 4 carbon atoms is preferable, and methyl (meth)acrylate or ethyl (meth)acrylate is more preferable.

The (meth)acrylic resin may have a constitutional unit other than the constitutional unit derived from a (meth)acrylic compound.

The polymerizable monomer forming the above-described constitutional unit is not particularly limited as long as it is a compound other than the (meth)acrylic compound, which can be copolymerized with the (meth)acrylic compound, and examples thereof include styrene compounds which may have a substituent at an α-position or an aromatic ring, such as styrene, vinyltoluene, and α-methylstyrene, vinyl alcohol esters such as acrylonitrile and vinyl-n-butyl ether, maleic acid monoesters such as maleic acid, maleic acid anhydride, monomethyl maleate, monoethyl maleate, and monoisopropyl maleate, fumaric acid, cinnamic acid, α-cyanocinnamic acid, itaconic acid, and crotonic acid.

These polymerizable monomers may be used alone or in combination of two or more kinds thereof.

In addition, from the viewpoint of improving alkali developability, the (meth)acrylic resin preferably has a constitutional unit having an acid group. Examples of the acid group include a carboxy group, a sulfo group, a phosphoric acid group, and a phosphonic acid group.

Among these, the (meth)acrylic resin more preferably has a constitutional unit having a carboxy group, and still more preferably has a constitutional unit derived from the above-described (meth)acrylic acid.

From the viewpoint of excellent developability, the content of the constitutional unit having an acid group (preferably, the constitutional unit derived from (meth)acrylic acid) in the (meth)acrylic resin is preferably 10% by mass or more with respect to the total mass of the (meth)acrylic resin. In addition, the upper limit value thereof is not particularly limited, but from the viewpoint of excellent alkali resistance, is preferably 50% by mass or less and more preferably 40% by mass or less.

In addition, it is more preferable that the (meth)acrylic resin has a constitutional unit derived from the above-described (meth)acrylic acid alkyl ester.

In a case of having a constitutional unit derived from the (meth)acrylic acid alkyl ester, a content of the constitutional unit derived from (meth)acrylic acid alkyl ester in the (meth)acrylic resin is preferably 1% to 90% by mass, more preferably 1% to 50% by mass, and still more preferably 1% to 30% by mass with respect to all constitutional units of the (meth)acrylic resin.

As the (meth)acrylic resin, a resin having both the constitutional unit derived from (meth)acrylic acid and the constitutional unit derived from (meth)acrylic acid alkyl ester is preferable, and a resin composed only of the constitutional unit derived from (meth)acrylic acid and the constitutional unit derived from (meth)acrylic acid alkyl ester is more preferable.

In addition, as the (meth)acrylic resin, an acrylic resin which has a constitutional unit derived from methacrylic acid, a constitutional unit derived from methyl methacrylate, and a constitutional unit derived from ethyl acrylate is also preferable.

In addition, from the viewpoint that the effect of the present invention is more excellent, the (meth)acrylic resin preferably has at least one selected from the group consisting of a constitutional unit derived from methacrylic acid and a constitutional unit derived from methacrylic acid alkyl ester, and more preferably has both the constitutional unit derived from methacrylic acid and the constitutional unit derived from methacrylic acid alkyl ester.

From the viewpoint that the effect of the present invention is more excellent, the total content of the constitutional unit derived from methacrylic acid and the constitutional unit derived from methacrylic acid alkyl ester in the (meth)acrylic resin is preferably 40% by mass or more and more preferably 60% by mass or more with respect to all constitutional units of the (meth)acrylic resin. The upper limit is not particularly limited, and may be 100% by mass or less, preferably 80% by mass or less.

In addition, from the viewpoint that the effect of the present invention is more excellent, it is also preferable that the (meth)acrylic resin has at least one selected from the group consisting of a constitutional unit derived from methacrylic acid and a constitutional unit derived from methacrylic acid alkyl ester, and has at least one selected from the group consisting of a constitutional unit derived from acrylic acid and a constitutional unit derived from acrylic acid alkyl ester.

From the viewpoint that the effect of the present invention is more excellent, the total content of the constitutional unit derived from methacrylic acid and the constitutional unit derived from methacrylic acid alkyl ester is preferably 60/40 to 80/20 in terms of mass ratio with respect to the total content of the constitutional unit derived from acrylic acid and the constitutional unit derived from acrylic acid alkyl ester.

From the viewpoint of excellent developability of the curable composition layer after transfer, the (meth)acrylic resin preferably has an ester group at the terminal.

The terminal portion of the (meth)acrylic resin is composed of a site derived from a polymerization initiator used in the synthesis. The (meth)acrylic resin having an ester group at the terminal can be synthesized by using a polymerization initiator which generates a radical having an ester group.

In addition, examples of other suitable aspects of the binder polymer include an alkali-soluble resin.

From the viewpoint of developability, for example, the binder polymer is also preferably a binder polymer having an acid value of 60 mgKOH/g or more.

In addition, from the viewpoint that it is easy to form a strong film by thermally crosslinking with a crosslinking component by heating, for example, the binder polymer is more preferably a resin (so-called a carboxy group-containing resin) having an acid value of 60 mgKOH/g or more and having a carboxy group, and still more preferably a (meth) acrylic resin (so-called a carboxy group-containing (meth) acrylic resin) having an acid value of 60 mgKOH/g or more and having a carboxy group.

In a case where the binder polymer is a resin having a carboxy group, for example, the three-dimensional crosslinking density can be increased by adding a thermal crosslinking compound such as a blocked isocyanate compound and thermally crosslinking. In addition, in a case where the carboxy group of the resin having a carboxy group is anhydrous and hydrophobized, wet heat resistance can be improved.

The carboxy group-containing (meth)acrylic resin having an acid value of 60 mgKOH/g or more is not particularly limited as long as the above-described conditions of acid value are satisfied, and a known (meth)acrylic resin can be appropriately selected.

For example, a carboxy group-containing acrylic resin having an acid value of 60 mgKOH/g or more among polymers described in paragraph [0025] of JP2011-095716A, a carboxy group-containing acrylic resin having an acid value of 60 mgKOH/g or more among polymers described in paragraphs [0033] to [0052] of JP2010-237589A, and the like can be preferably used.

Examples of other suitable aspects of the binder polymer include a styrene-acrylic copolymer.

In the present specification, the styrene-acrylic copolymer refers to a resin having a constitutional unit derived from a styrene compound and a constitutional unit derived from a (meth)acrylic compound, and the total content of the constitutional unit derived from a styrene compound and the constitutional unit derived from a (meth)acrylic compound is preferably 30% by mass or more and more preferably 50% by mass or more with respect to all constitutional units of the copolymer.

In addition, the content of the constitutional unit derived from a styrene compound is preferably 1% by mass or more, more preferably 5% by mass or more, and still more preferably 5% to 80% by mass with respect to the all constitutional units of the above-described copolymer.

In addition, the content of the constitutional unit derived from the above-described (meth)acrylic compound is preferably 5% by mass or more, more preferably 10% by mass or more, and still more preferably 20% by mass to 95% by mass with respect to the all constitutional units of the above-described copolymer.

From the viewpoint that the effect of the present invention is more excellent, the binder polymer preferably has an aromatic ring structure, and more preferably has a constitutional unit having an aromatic ring structure.

Examples of a monomer forming the constitutional unit having an aromatic ring structure include a monomer having an aralkyl group, styrene, and a polymerizable styrene derivative (for example, methylstyrene, vinyltoluene, tert-butoxystyrene, acetoxystyrene, 4-vinylbenzoic acid, styrene dimer, and styrene trimer). Among these, a monomer having an aralkyl group or styrene is preferable. Examples of the aralkyl group include a substituted or unsubstituted phenylalkyl group (excluding a benzyl group), and a substituted or unsubstituted benzyl group, and a substituted or unsubstituted benzyl group is preferable.

Examples of a monomer having the phenylalkyl group include phenylethyl (meth)acrylate.

Examples of a monomer having the benzyl group include (meth)acrylates having a benzyl group, such as benzyl (meth)acrylate and chlorobenzyl (meth)acrylate; and vinyl monomers having a benzyl group, such as vinylbenzyl chloride and vinylbenzyl alcohol. Among these, benzyl (meth)acrylate is preferable.

In addition, from the viewpoint that the effect of the present invention is more excellent, the binder polymer more preferably has a constitutional unit represented by Formula (S) (constitutional unit derived from styrene).

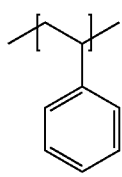

(S)

In a case where the binder polymer has the constitutional unit having an aromatic ring structure, from the viewpoint that the effect of the present invention is more excellent, the content of the constitutional unit having an aromatic ring structure is preferably 5% to 90% by mass, more preferably 10% to 70% by mass, and still more preferably 20% to 60% by mass with respect to the all constitutional units of the binder polymer.

In addition, from the viewpoint that the effect of the present invention is more excellent, the content of the constitutional unit having an aromatic ring structure in the binder polymer is preferably in a range of 5% to 70% by mole, more preferably in a range of 10% to 60% by mole, and still more preferably in a range of 20% to 60% by mole with respect to all the constitutional units of the binder polymer.

Further, from the viewpoint that the effect of the present invention is more excellent, the content of the constitutional unit represented by Formula (S) in the binder polymer is preferably 5 to 70 mol %, more preferably 10 to 60 mol %, still more preferably 20 to 60 mol %, and particularly preferably 20 to 50 mol % with respect to all constitutional units of the binder polymer.

In the present specification, in a case where the content of a "constitutional unit" is defined by a molar ratio, the "constitutional unit" is synonymous with the "monomer unit". In addition, in the present specification, the "monomer unit" may be modified after polymerization by a polymer reaction or the like. The same applies to the following.

From the viewpoint that the effect of the present invention is more excellent, the binder polymer preferably has an aliphatic hydrocarbon ring structure. That is, the binder polymer preferably has a constitutional unit having an aliphatic hydrocarbon ring structure. The aliphatic hydrocarbon ring structure may be monocyclic or polycyclic. Among these, the binder polymer more preferably has a ring structure in which two or more aliphatic hydrocarbon rings are fused.

Examples of a ring constituting the aliphatic hydrocarbon ring structure in the constitutional unit having an aliphatic hydrocarbon ring structure include a tricyclodecane ring, a cyclohexane ring, a cyclopentane ring, a norbornane ring, and an isophorone ring.

Among these, from the viewpoint that the effect of the present invention is more excellent, a ring in which two or more aliphatic hydrocarbon rings are fused is preferable, and a tetrahydrodicyclopentadiene ring (tricyclo[5.2.1.02.6]decane ring) is more preferable.

Examples of a monomer forming the constitutional unit having an aliphatic hydrocarbon ring structure include dicyclopentanyl (meth)acrylate, cyclohexyl (meth)acrylate, and isobornyl (meth)acrylate.

In addition, from the viewpoint that the effect of the present invention is more excellent, the binder polymer more preferably has a constitutional unit represented by Formula (Cy), and still more preferably has the constitutional unit represented by Formula (S) and the constitutional unit represented by Formula (Cy).

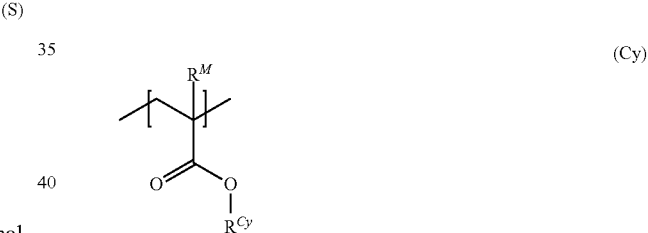

(Cy)

In Formula (Cy), $R^M$ represents a hydrogen atom or a methyl group, and $R^{Cy}$ represents a monovalent group having an aliphatic hydrocarbon ring structure.

$R^M$ in Formula (Cy) is preferably a methyl group.

From the viewpoint that the effect of the present invention is more excellent, $R^{Cy}$ in Formula (Cy) is preferably a monovalent group having an aliphatic hydrocarbon ring structure having 5 to 20 carbon atoms, more preferably a monovalent group having an aliphatic hydrocarbon ring structure having 6 to 16 carbon atoms, and still more preferably a monovalent group having an aliphatic hydrocarbon ring structure having 8 to 14 carbon atoms.

In addition, from the viewpoint that the effect of the present invention is more excellent, the aliphatic hydrocarbon ring structure in $R^{Cy}$ of Formula (Cy) is preferably a cyclopentane ring structure, a cyclohexane ring structure, a tetrahydrodicyclopentadiene ring structure, a norbornane ring structure, or an isophorone ring structure, more preferably a cyclohexane ring structure or a tetrahydrodicyclopentadiene ring structure, and still more preferably a tetrahydrodicyclopentadiene ring structure.

Furthermore, from the viewpoint that the effect of the present invention is more excellent, the aliphatic hydrocarbon ring structure in $R^{Cy}$ of Formula (Cy) is preferably a ring structure in which two or more aliphatic hydrocarbon rings are fused, and more preferably a ring structure in which two to four aliphatic hydrocarbon rings are fused.

Furthermore, from the viewpoint that the effect of the present invention is more excellent, $R^{Cy}$ in Formula (Cy) is preferably a group in which the oxygen atom in —C(=O)O— of Formula (Cy) and the aliphatic hydrocarbon ring structure are directly bonded, that is, an aliphatic hydrocarbon ring group, more preferably a cyclohexyl group or a dicyclopentanyl group, and still more preferably a dicyclopentanyl group.

The binder polymer may have one constitutional unit having an aliphatic hydrocarbon ring structure alone, or two or more kinds thereof.

In a case where the binder polymer has the constitutional unit having an aliphatic hydrocarbon ring structure, from the viewpoint that the effect of the present invention is more excellent, the content of the constitutional unit having an aliphatic hydrocarbon ring structure is preferably 5% to 90% by mass, more preferably 10% to 80% by mass, and still more preferably 20% to 70% by mass with respect to the all constitutional units of the binder polymer.

In addition, from the viewpoint that the effect of the present invention is more excellent, the content of the constitutional unit having an aliphatic hydrocarbon ring structure in the binder polymer is preferably 5 to 70 mol %, more preferably 10 to 60 mol %, and still more preferably 20 to 50 mol % with respect to all constitutional units of the binder polymer.

Further, from the viewpoint that the effect of the present invention is more excellent, the content of the constitutional unit represented by Formula (Cy) in the binder polymer is preferably 5 to 70 mol %, more preferably 10 to 60 mol %, and still more preferably 20 to 50 mol % with respect to all constitutional units of the binder polymer.

In a case where the binder polymer includes the constitutional unit having an aromatic ring structure and the constitutional unit having an aliphatic hydrocarbon ring structure, from the viewpoint that the effect of the present invention is more excellent, the total content of the constitutional unit having an aromatic ring structure and the constitutional unit having an aliphatic hydrocarbon ring structure is preferably 10% to 90% by mass, more preferably 20% to 80% by mass, and still more preferably 40% to 75% by mass with respect to all constitutional units of the binder polymer.

In addition, from the viewpoint that the effect of the present invention is more excellent, the total content of the constitutional unit having an aromatic ring structure and the constitutional unit having an aliphatic hydrocarbon ring structure in the binder polymer is preferably 10 to 80 mol %, more preferably 20 to 70 mol %, and still more preferably 40 to 60 mol % with respect to all constitutional units of the binder polymer.

Further, from the viewpoint that the effect of the present invention is more excellent, the total content of the constitutional unit represented by Formula (S) and the constitutional unit represented by Formula (Cy) in the binder polymer is preferably 10 to 80 mol %, more preferably 20 to 70 mol %, and still more preferably 40 to 60 mol % with respect to all constitutional units of the binder polymer.

In addition, from the viewpoint that the effect of the present invention is more excellent, a molar amount nS of the constitutional unit represented by Formula (S) and a molar amount nCy of the constitutional unit represented by Formula (Cy) in the binder polymer preferably satisfy the relationship shown in the following expression (SCy), more preferably satisfy the following expression (SCy-1), and still more preferably satisfy the following expression (SCy-2).

$0.2 \leq nS/(nS+nCy) \leq 0.8$   Expression (SCy)

$0.30 \leq nS/(nS+nCy) \leq 0.75$   Expression (SCy-1)

$0.40 \leq nS/(nS+nCy) \leq 0.70$   Expression (SCy-2)

From the viewpoint that the effect of the present invention is more excellent, the binder polymer preferably has a constitutional unit having an acid group.

Examples of the above-described acid group include a carboxy group, a sulfo group, a phosphonic acid group, and a phosphoric acid group, and a carboxy group is preferable.

As the above-described constitutional unit having an acid group, constitutional units derived from (meth)acrylic acid, which are shown below, is preferable, and a constitutional unit derived from methacrylic acid is more preferable.

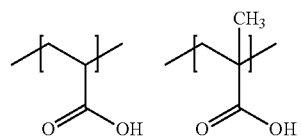

The binder polymer may have one constitutional unit having an acid group alone, or two or more kinds thereof.

In a case where the binder polymer has the constitutional unit having an acid group, from the viewpoint that the effect of the present invention is more excellent, the content of the constitutional unit having an acid group is preferably 5% to 50% by mass, more preferably 5% to 40% by mass, and still more preferably 10% to 30% by mass with respect to the all constitutional units of the binder polymer.

In addition, from the viewpoint that the effect of the present invention is more excellent, the content of the constitutional unit having an acid group in the binder polymer is preferably 5 to 70 mol %, more preferably 10 to 50 mol %, and still more preferably 20 to 40 mol % with respect to all constitutional units of the binder polymer.

Further, from the viewpoint that the effect of the present invention is more excellent, the content of the constitutional unit derived from (meth)acrylic acid in the binder polymer is preferably 5 to 70 mol %, more preferably 10 to 50 mol %, and still more preferably 20 to 40 mol % with respect to all constitutional units of the binder polymer.

From the viewpoint that the effect of the present invention is more excellent, the binder polymer preferably has a reactive group, and more preferably has a constitutional unit having a reactive group.

As the reactive group, a radically polymerizable group is preferable, and an ethylenically unsaturated group is more preferable. In addition, in a case where the binder polymer has an ethylenically unsaturated group, the binder polymer preferably has a constitutional unit having an ethylenically unsaturated group in the side chain. That is, as the binder polymer, a binder polymer having an ethylenically unsaturated group in the side chain is preferable.

In the present specification, the "main chain" represents a relatively longest bonding chain in a molecule of a polymer compound constituting a resin, and the "side chain" represents an atomic group branched from the main chain.

As the ethylenically unsaturated group, an allyl group or a (meth)acryloxy group is more preferable.

Examples of the constitutional unit having a reactive group include those shown below, but the constitutional unit having a reactive group is not limited thereto.

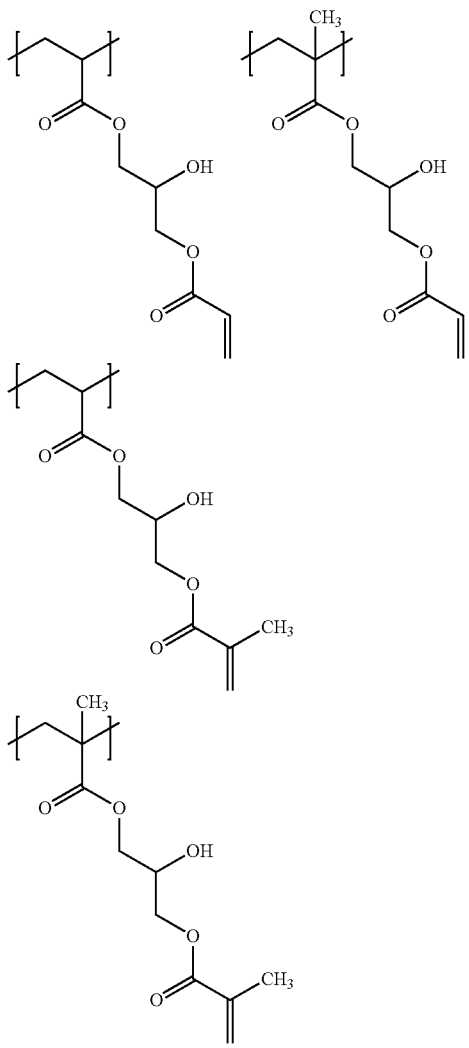

The binder polymer may have one constitutional unit having a reactive group alone, or two or more kinds thereof.

In a case where the binder polymer has the constitutional unit having a reactive group, from the viewpoint that the effect of the present invention is more excellent, a content of the constitutional unit having a reactive group is preferably 5% to 70% by mass, more preferably 10% to 50% by mass, and still more preferably 20% to 40% by mass with respect to the all constitutional units of the binder polymer.

In addition, from the viewpoint that the effect of the present invention is more excellent, the content of the constitutional unit having a reactive group in the binder polymer is preferably 5 to 70 mol %, more preferably 10 to 60 mol %, and still more preferably 20 to 50 mol % with respect to all constitutional units of the binder polymer.

Examples of a method for introducing the reactive group into the binder polymer include a method of reacting a compound such as an epoxy compound, a blocked isocyanate compound, an isocyanate compound, a vinyl sulfone compound, an aldehyde compound, a methylol compound, and a carboxylic acid anhydride with a functional group such as a hydroxy group, a carboxy group, a primary amino group, a secondary amino group, an acetoacetyl group, and a sulfo group.

Preferred examples of the method for introducing the reactive group into the binder polymer include a method in which a polymer having a carboxy group is synthesized by a polymerization reaction, and then a glycidyl (meth)acrylate is reacted with a part of the carboxy group of the obtained polymer by a polymer reaction, thereby introducing a (meth)acryloxy group into the polymer. By this method, a binder polymer having a (meth)acryloxy group in the side chain can be obtained.

The above-described polymerization reaction is preferably carried out under a temperature condition of 70° C. to 100° C., and more preferably carried out under a temperature condition of 80° C. to 90° C. As a polymerization initiator used in the above-described polymerization reaction, an azo-based initiator is preferable, and for example, V-601 (product name) or V-65 (product name) manufactured by FUJIFILM Wako Pure Chemical Corporation is more preferable. The above-described polymer reaction is preferably carried out under a temperature condition of 80° C. to 110° C. In the above-described polymer reaction, it is preferable to use a catalyst such as an ammonium salt.

The binder polymer may be a polymer shown below. Content ratios (a to d) and weight-average molecular weights Mw of each of the constitutional units shown below can be appropriately changed according to the purpose.

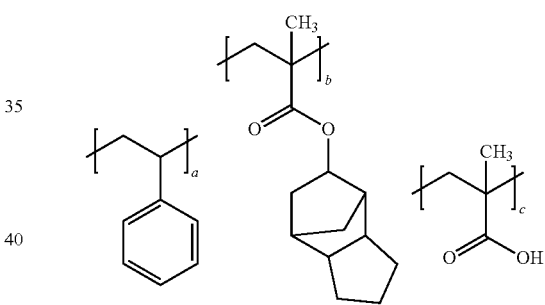

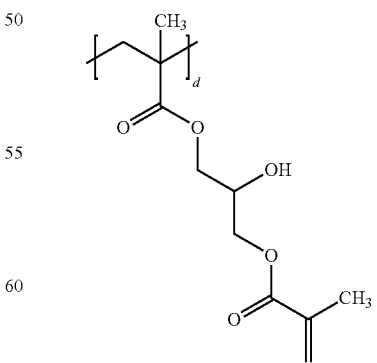

a to d in the above-described binder polymer are respectively preferably a: 20 to 60 wt %, b: 10 to 50 wt %, c: 5.0 to 25 wt %, and d: 10 to 50 wt %.

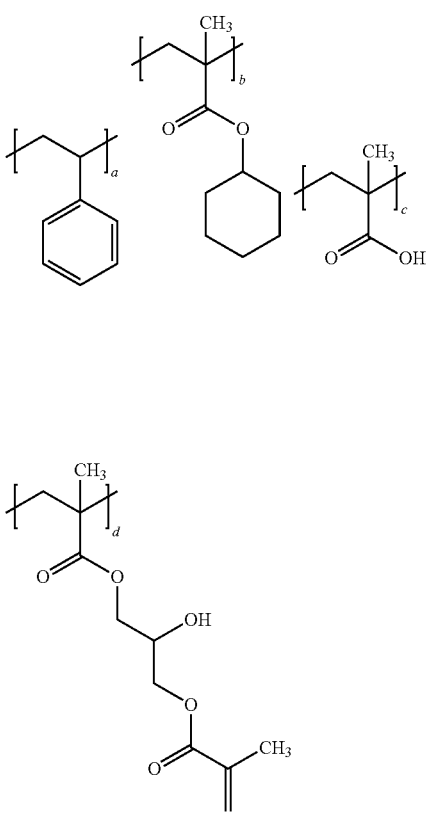

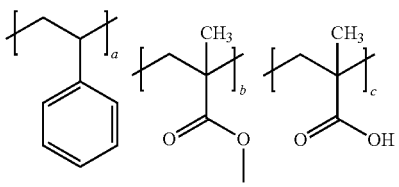

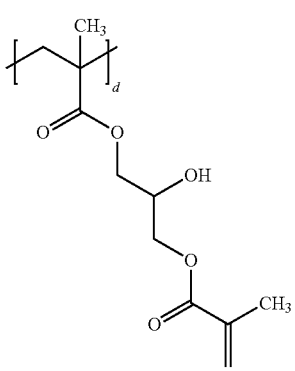

a to d in the above-described binder polymer are respectively preferably a: 20 to 60 wt %, b: 10 to 50 wt %, c: 5.0 to 25 wt %, and d: 10 to 50 wt %.

a to d in the above-described binder polymer are respectively preferably a: 30 to 65 wt %, b: 1.0 to 20 wt %, c: 5.0 to 25 wt %, and d: 10 to 50 wt %.

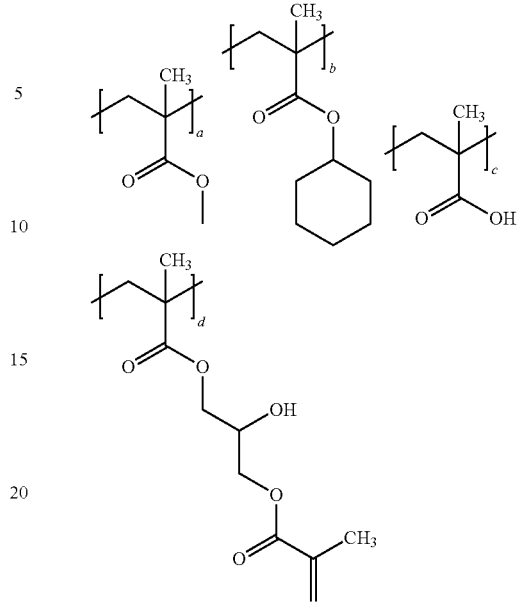

a to d in the above-described binder polymer are respectively preferably a: 1.0 to 20 wt %, b: 20 to 60 wt %, c: 5.0 to 25 wt %, and d: 10 to 50 wt %.

In addition, the binder polymer may include a polymer (hereinafter, also referred to as a "polymer X") having a constitutional unit having a carboxylic acid anhydride structure.

The carboxylic acid anhydride structure may be either a chain carboxylic acid anhydride structure or a cyclic carboxylic acid anhydride structure, and a cyclic carboxylic acid anhydride structure is preferable.

The ring of the cyclic carboxylic acid anhydride structure is preferably a 5- to 7-membered ring, more preferably a 5-membered ring or a 6-membered ring, and still more preferably a 5-membered ring.

The constitutional unit having a carboxylic acid anhydride structure is preferably a constitutional unit containing a divalent group obtained by removing two hydrogen atoms from a compound represented by Formula P-1 in a main chain, or a constitutional unit in which a monovalent group obtained by removing one hydrogen atom from a compound represented by Formula P-1 is bonded to the main chain directly or through a divalent linking group.

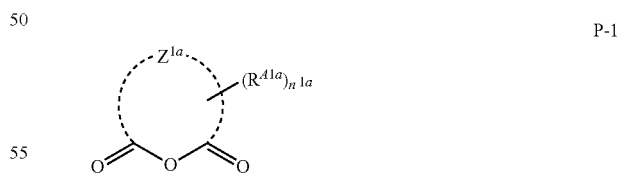

P-1

In Formula P-1, $R^{A1a}$ represents a substituent, $n^{1a}$ pieces of $R^{A1a}$'s may be the same or different, $Z^{1a}$ represents a divalent group forming a ring including —C(=O)—O—C(=O)—, and $n^{1a}$ represents an integer of 0 or more.

Examples of the substituent represented by $R^{A1a}$ include an alkyl group.

$Z^{1a}$ is preferably an alkylene group having 2 to 4 carbon atoms, more preferably an alkylene group having 2 or 3 carbon atoms, and still more preferably an alkylene group having 2 carbon atoms.

$n^{1a}$ represents an integer of 0 or more. In a case where $Z^{1a}$ represents an alkylene group having 2 to 4 carbon atoms, $n^{1a}$ is preferably an integer of 0 to 4, more preferably an integer of 0 to 2, and still more preferably 0.

In a case where $n^{1a}$ represents an integer of 2 or more, a plurality of $R^{Ala}$'s existing may be the same or different. In addition, the plurality of $R^{Ala}$'s existing may be bonded to each other to form a ring, but it is preferable that they are not bonded to each other to form a ring.

As the constitutional unit having a carboxylic acid anhydride structure, a constitutional unit derived from an unsaturated carboxylic acid anhydride is preferable, a constitutional unit derived from an unsaturated cyclic carboxylic acid anhydride is more preferable, a constitutional unit derived from an unsaturated aliphatic carboxylic acid anhydride is still more preferable, a constitutional unit derived from maleic anhydride or itaconic anhydride is particularly preferable, and a constitutional unit derived from maleic acid anhydride is most preferable.

Hereinafter, specific examples of the constitutional unit having a carboxylic acid anhydride structure will be described, but the constitutional unit having a carboxylic acid anhydride structure is not limited to these specific examples. In the following constitutional units, Rx represents a hydrogen atom, a methyl group, a $CH_2OH$ group, or a $CF_3$ group, and Me represents a methyl group.

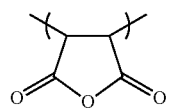

Formula a2-1

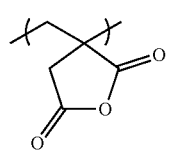

Formula a2-2

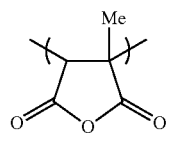

Formula a2-3

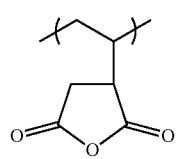

Formula a2-4

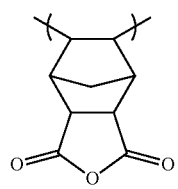

Formula a2-5

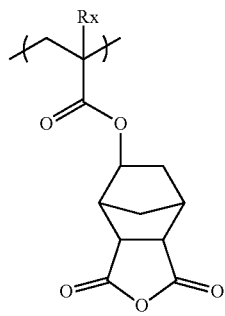

Formula a2-6

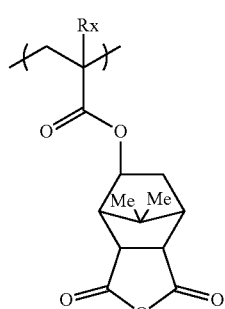

Formula a2-7

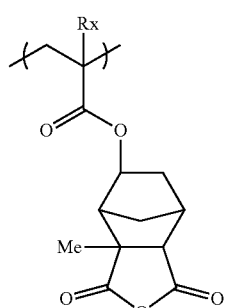

Formula a2-8

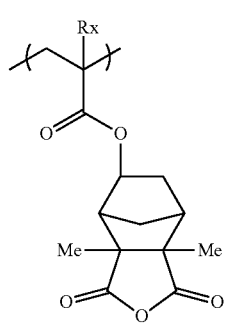

Formula a2-9

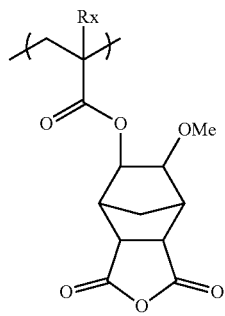

Formula a2-10

Formula 2-11
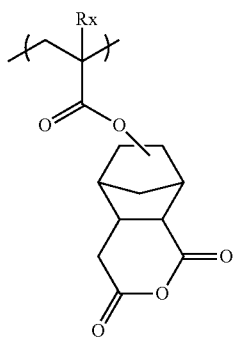
Formula a2-12
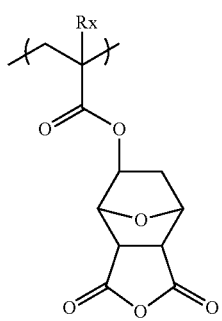
Formula a2-13
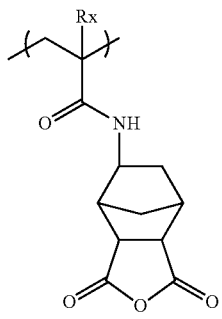
Formula a2-14
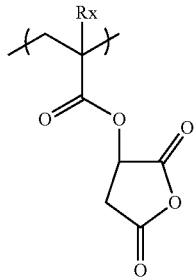
Formula a2-15
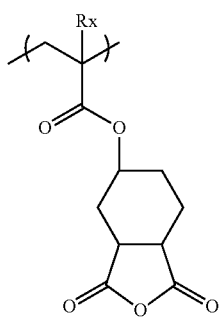
Formula a2-16
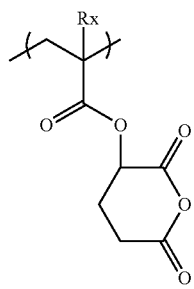
Formula a2-17
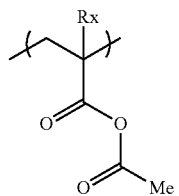
Formula a2-18
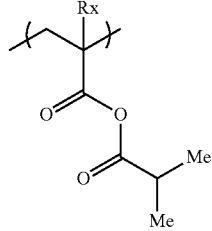
Formula a2-19
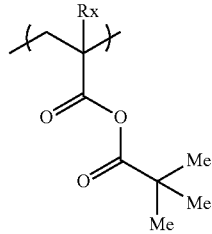
Formula a2-20
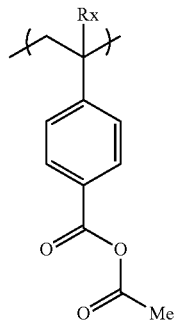
Formula a2-21
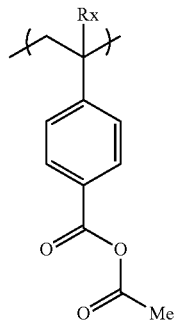

The polymer X may have one constitutional unit having a carboxylic acid anhydride structure alone, or two or more kinds thereof.

The total content of the constitutional unit having a carboxylic acid anhydride structure is preferably 0 to 60 mol %, more preferably 5 to 40 mol %, and still more preferably 10 to 35 mol % with respect to all constitutional units of the polymer X.

The organic film may contain only one kind of the polymer X, or may contain two or more kinds thereof.

In a case where the organic film contains the polymer X, a content of the polymer X is preferably 0.1% to 30% by mass, more preferably 0.2% to 20% by mass, still more preferably 0.5% to 20% by mass, and even more preferably 1% to 20% by mass with respect to the total mass of the organic film.

Examples of one suitable aspect of the binder polymer include a cycloolefin polymer. Examples of the cycloolefin polymer include the cycloolefin polymer which may be contained in the dielectric film described above.

From the viewpoint that the effect of the present invention is more excellent, a weight-average molecular weight (Mw) of the binder polymer is preferably 5,000 or more, more preferably 10,000 or more, still more preferably 10,000 to 50,000, and particularly preferably 15,000 to 30,000.

From the viewpoint of developability, a dispersity of the binder polymer is preferably 1.0 to 6.0, more preferably 1.0 to 5.0, still more preferably 1.0 to 4.0, and particularly preferably 1.0 to 3.0.

The binder polymer may or may not have an acid group, and in a case where the binder polymer has an acid group, an acid value of the binder polymer is not particularly limited and is preferably 1000 mgKOH/g or less, more preferably 200 mgKOH/g or less, and still more preferably 20 mgKOH/g or less. In a case where the polymer has an acid group, the lower limit of the acid value is not particularly limited and is more than 0 mgKOH/g in many cases.

The acid value of the binder polymer is a value measured according to the method described in JIS K0070: 1992.

The curable composition layer may contain only one kind of binder polymer or may contain two or more kinds of binder polymers.

In a case where the curable composition layer contains a binder polymer, a content of the binder polymer is preferably 10% to 90% by mass, more preferably 20% to 80% by mass, and still more preferably from 30% to 70% by mass with respect to the total mass of the curable composition layer.

(Curable Compound)

In addition, the curable composition layer may contain a curable compound.

As the curable compound, a compound which is cured by light or heat is preferable.

Examples of the compound which is cured by light or heat include a compound having an ethylenically unsaturated double bond, a compound having a conjugated diene moiety, a compound having a maleimide moiety, a thiol compound which is cured by an ene-thiol reaction, an epoxy compound, and a compound having a group which is crosslinked by an action of acid. From the viewpoint of curing properties, a compound having an ethylenically unsaturated double bond is preferable. From the viewpoint of curing properties and compatibility with the alkali-soluble resin, the curable compound is more preferably a compound having an acryloyl group in the molecule.

Examples of the compound having an ethylenically unsaturated double bond include a compound in which (meth)acrylic acid is added to one terminal of polyalkylene oxide, and a compound in which (meth)acrylic acid is added to one terminal and the other terminal is converted to alkyl ether or allyl ether.

Examples of such a compound include phenoxyhexaethylene glycol mono(meth)acrylate, which is a (meth)acrylate of a compound in which polyethylene glycol is added to a phenyl group; 4-normal nonylphenoxyheptaethylene glycol dipropylene glycol (meth)acrylate, which is a (meth)acrylate of a compound obtained by adding polypropylene glycol with an average of 2 mol of propylene oxide added and polyethylene glycol with an average of 7 mol of ethylene oxide added to nonylphenol; and 4-normal nonylphenoxypentaethylene glycol monopropylene glycol (meth)acrylate, which is a (meth)acrylate of a compound obtained by adding polypropylene glycol with an average of 1 mol of propylene oxide added and polyethylene glycol with an average of 5 mol of ethylene oxide added to nonylphenol. Examples thereof also include 4-normal nonylphenoxy octaethylene glycol (meth)acrylate (manufactured by TOAGOSEI CO., LTD., M-114), which is an acrylate of a compound obtained by adding polyethylene glycol with an average of 8 mol of ethylene oxide added to nonylphenol.

Examples of the compound having an ethylenically unsaturated double bond also include a compound having (meth)acryloyl groups at both terminals of an alkylene oxide chain and a compound (meth)acryloyl groups at both terminals of an alkylene oxide chain in which an ethylene oxide chain and a propylene oxide chain are randomly or block-bonded.

Examples of such a compound include tetraethylene glycol di(meth)acrylate, pentaethylene glycol di(meth)acrylate, hexaethylene glycol di(meth)acrylate, heptaethylene glycol di(meth)acrylate, octaethylene glycol di(meth)acrylate, nonaethylene glycol di(meth)acrylate meth)acrylate, decaethylene glycol di(meth)acrylate, and a compound having 12 mol of (meth)acryloyl groups at both terminals of an ethylene oxide chain.

Furthermore, a polyalkylene oxide di(meth)acrylate compound including at least an ethylene oxide group and a propylene oxide group in the compound is preferable from the viewpoint of resolution, flexibility, and plating resistance. From the same viewpoint, a molecular weight of the above-described compound is preferably 600 to 1,500, more preferably 900 to 1,300, and still more preferably 1,000 to 1,200.

Examples of the polyalkylene oxide di(meth)acrylate compound including at least an ethylene oxide group and a propylene oxide group in the compound include a dimethacrylate of a glycol, which is obtained by further adding an average of 3 mol of ethylene oxide to both terminal of a polypropylene glycol obtained by adding an average of 12 mol of propylene oxide, and a dimethacrylate of a glycol, which is obtained by adding an average of 15 mol of ethylene oxide to both terminals of a polypropylene glycol obtained by adding an average of 18 mol of propylene oxide.

In addition, an alkylene oxide-modified compound of bisphenol A, which has (meth)acryloyl groups at both terminals, is also preferable.

Examples of the alkylene oxide modification include ethylene oxide modification, propylene oxide modification, butylene oxide modification, pentylene oxide modification, and hexylene oxide modification. As the above-described compound, an ethylene oxide-modified compound of bisphenol A, which has (meth)acryloyl groups at both terminals, is preferable. Examples of such a compound include 2,2-bis(4-((meth)acryloxypolyethoxy)phenyl)propanes such as 2,2-bis(4-((meth)acryloxydiethoxy)phenyl)propane (manufactured by Shin-Nakamura Chemical Co., Ltd., NK ESTER BPE-200), 2,2-bis(4-((meth)acryloxytriethoxy)phenyl)propane, 2,2-bis(4-((meth)acryloxytetraethoxy)phenyl)propane, 2,2-bis(4-((meth)acryloxypentaethoxy)phenyl) propane (manufactured by Shin-Nakamura Chemical Co., Ltd., NK ESTER BPE-500), 2,2-bis(4-((meth)acryloxyhexaethoxy)phenyl)propane, 2,2-bis(4-((meth)acryloxyheptaethoxy)phenyl)propane, 2,2-bis(4-((meth)acryloxyoctaethoxy)phenyl)propane, 2,2-bis(4-((meth)acryloxynonaethoxy)phenyl)propane, 2,2-bis(4-((meth)acryloxydecaethoxy)phenyl)propane, 2,2-bis(4-((meth)acryloxyundeca) ethoxy)phenyl)propane, 2,2-bis(4-((meth)acryloxydodecaethoxy)phenyl)propane, 2,2-bis(4-((meth)acryloxytridecaethoxy)phenyl)propane, 2,2-bis(4-((meth)acryloxytetradecaethoxy)phenyl)propane, 2,2-bis(4-((meth)acryloxypentadecaethoxy)phenyl)propane, and 2,2-bis(4-((meth)acryloxyhexadecaethoxy)phenyl)propane.

The compound having more than two (meth)acryloyl groups in one molecule is obtained from a compound, as a central skeleton, having 3 mol or more of groups to which an alkylene oxide group can be added in the molecule, and by adding an alkylene oxide group such as an ethylene oxide group, propylene oxide and butylene oxide to the compound and then (meth)acrylate-forming the obtained alcohol. Examples of the compound which can form the central skeleton include glycerin, trimethylolpropane, pentaerythritol, dipentaerythritol, and an isocyanurate ring.

In addition to the above-described compounds, the following compounds can be appropriately included.

Examples thereof include 1,6-hexanediol di(meth)acrylate, 1,4-cyclohexanediol di(meth)acrylate, 2-di(p-hydroxyphenyl)propane di(meth)acrylate, 2,2-bis [(4-(meth)acryloxypolypropyleneoxy)phenyl]propane, 2,2-bis[(4-(meth) acryloxypolybutyleneoxy)phenyl]propane, glycerol tri (meth)acrylate, trimethylolpropane tri(meth)acrylate, polyoxypropyltrimethylolpropane tri(meth)acrylate, dipentaerythritol penta(meth)acrylate, trimethylolpropane triglycidyl ether tri(meth)acrylate, β-hydroxypropyl-β'-(acryloyloxy)propyl phthalate, nonylphenoxypolypropylene glycol (meth)acrylate, nonylphenoxypolybutylene glycol (meth) acrylate, and polypropylene glycol mono(meth)acrylate.

Furthermore, the following urethane compounds are also exemplified. Examples thereof include hexamethylene diisocyanate, tolylene diisocyanate, or a diisocyanate compound (for example, 2,2,4-trimethylhexamethylene diisocyanate); and urethane compounds such as a compound having a hydroxyl group and a (meth)acryloyl group in one molecule, for example, 2-hydroxypropyl acrylate and oligopropylene glycol monomethacrylate. Specific examples thereof include a reaction product of hexamethylene diisocyanate and oligopropylene glycol monomethacrylate (manufactured by NOF CORPORATION, Blemmer PP1000). In addition, examples thereof also include di- or tri(meth)acrylates of isocyanurate modified with polypropylene glycol or polycaprolactone. In addition, examples thereof also include a urethane oligomer obtained by reacting a terminal of a urethane compound obtained as a polyadduct of a diisocyanate and a polyol with a compound having an ethylenically unsaturated double bond and a hydroxyl group.

Examples of the compound having a conjugated diene moiety include a compound in which a substituent is introduced into butadiene or isoprene to be non-volatile, polyacetylene and a derivative thereof, and polyphenylacetylene.

Examples of the compound having a maleimide moiety include a polymer compound having a maleimide group in the side chain, a compound having two or more maleimide groups in the molecule, and a compound having a (meth) acryloyl group and a maleimide group in the molecule.

Examples of the thiol compound which is cured by an ene-thiol reaction include compounds having an aliphatic thiol group, such as pentaerythritol tetrakisthiopropionate, pentaerythritol tetrakis(3-mercaptobutyrate), and 1,3,5-tris (3-mercaptobutyloxyethyl)-1,3,5-triazine-2,4,6-(1H,3H, 5H)-trione.

Examples of the epoxy compound include an epoxy-modified compound of a novolac resin, an epoxy-modified compound of a cresol novolac resin, an epoxy-modified compound of bisphenol A, an epoxy-modified compound of ethylene oxide or propylene oxide-modified bisphenol A, an epoxy resin having a dicyclopentadiene skeleton, and an alicyclic epoxy compound. Among these, a compound having at least one glycidyl ether bond and at least one dicyclopentadienyl group in one molecule is preferable.

The alicyclic epoxy compound has at least one alicyclic epoxy group. Here, the alicyclic epoxy group refers to a monovalent substituent having a condensed ring between an epoxy ring and a saturated hydrocarbon ring, and is preferably a monovalent substituent having a condensed ring between an epoxy ring and a cycloalkane ring.

Examples of a commercially available product which can be suitably used as the alicyclic epoxy compound include CELLOXIDE (registered trademark) 2000, CELLOXIDE 2021P, CELLOXIDE 3000, CELLOXIDE 8000, CYCLOMER (registered trademark) M100, EPOLEAD GT301, and EPOLEAD GT401, which are of Daicel Corporation; 4-vinylcyclohexendioxide manufactured by Sigma-Aldrich, Inc.; D-limonene oxide of NIPPON TERPENE CHEMICALS, INC.; and SANSO CIZER (registered trademark) E-PS of New Japan Chemical Co., Ltd.

These can be used alone or in combination of two or more kinds thereof.

Examples of the compound having a group which is crosslinked by an action of acid include amino compounds such as a melamine resin, a urea resin, a guanamine resin, a glycoluril-formaldehyde resin, a succinylamide-formaldehyde resin, and an ethyleneurea-formaldehyde resin, and alkoxymethylated amino resins such as an alkoxymethylated melamine resin and an alkoxymethylated urea resin are particularly preferable.

The alkoxymethylated amino resin can be produced, for example, by a method in which a condensate obtained by reacting melamine or urea with formalin in boiling aqueous solution is reacted with lower alcohols such as methyl alcohol, ethyl alcohol, propyl alcohol, butyl alcohol, and isopropyl alcohol to form an ether, and then the reaction solution is cooled to precipitate.

Specific examples of the alkoxymethylated amino resin include a methoxymethylated melamine resin, an ethoxymethylated melamine resin, a propoxymethylated melamine resin, a butoxymethylated melamine resin, a methoxymethylated urea resin, an ethoxymethylated urea resin, a propoxymethylated urea resin, and a butoxymethylated urea resin.

The alkoxymethylated amino resin can be used alone or in combination of two or more kinds thereof. A methoxymethylated melamine resin, an ethoxymethylated melamine resin, a propoxymethylated melamine resin, or a butoxymethylated melamine resin is suitable.

Specific examples of the melamine resin include melamine, methylol melamine, etherified methylol melamine, benzoguanamine, etherified methylol benzoguanamine, and a condensate thereof. Among these, etherified methylol melamine is preferable from the viewpoint of excellent chemical resistance. A mixture of the etherified methylol melamine and a condensate thereof is commercially available as NIKALAC MW-30 (trade name) manufactured by Sanwa Chemical Co., Ltd.

In addition, a combination of a polyvalent isocyanate and a polyol can be used as the thermocurable compound. A urethane bond is formed by a reaction between an isocyanate group and a hydroxyl group of the polyol, and a urethane polymer is generated as the binder.

Examples of the polyvalent isocyanate (bi- or higher functional isocyanate) include phenylene-1,3-diisocyanate, phenylene-1,4-diisocyanate, 1-methoxyphenylene-2,4-diisocyanate, 1-methylphenylene-2,4-diisocyanate, 2,4-tolylene diisocyanate, 2,6-tolylene diisocyanate, 1,3-xylylene diisocyanate, 1,4-xylylene diisocyanate, biphenylene-4,4-diisocyanate, 3,3-dimethoxybiphenylene-4,4-diisocyanate, 3,3-dimethylbiphenylene-4,4-diisocyanate, diphenylmethane-2,4-diisocyanate, diphenylmethane-4,4-diisocyanate, 3,3-dimethoxydiphenylmethane-4,4-diisocyanate, 3,3-dimethyldiphenylmethane-4,4-diisocyanate, naphthylene-1,5-diisocyanate, cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanatomethylcyclohexane, cyclohexane-1,3-bis (methylisocyanate), cyclohexane-1,4-bis (methylisocyanate), isophorone diisocyanate, dicyclohexylmethane-2,4-diisocyanate, dicyclohexylmethane-4,4-diisocyanate, ethylene diisocyanate, tetramethylene-1,4-diisocyanate, hexamethylene-1,6-diisocyanate, dodecamethylene-1,12-diisocyanate, and both terminal isocyanate prepolymers obtained by reacting a stoichiometric excess amount of these organic diisocyanates with a bifunctional active hydrogen-containing compound.

Together with the above-described diisocyanate, a tri- or higher functional organic polyisocyanate such as phenyl-1,3,5-triisocyanate, diphenylmethane-2,4,4-triisocyanate, diphenylmethane-2,5,4-triisocyanate, triphenylmethane-2,4,4"triisocyanate, triphenylmethane-4,4,4"-triisocyanate, diphenylmethane-2,4,2,4-tetraisocyanate, diphenylmethane-2,5,2,5-tetraisocyanate, cyclohexane-1,3,5-triisocyanate, cyclohexane-1,3,5-tris(methylisocyanate), 3,5-dimethylcyclohexane-1,3,5-tris(methylisocyanate), 1,3,5-trimethylcyclohexane-1,3,5-tris(methylisocyanate), dicyclohexylmethane-2,4,2-triisocyanate, and dicyclohexylmethane-2,4,4-triisocyanate, a terminal isocyanate prepolymer obtained by reacting a stoichiometric excess of these tri- or higher functional organic polyisocyanates with a bi- or higher functional active hydrogen-containing compound, or the like may be used in combination.

Examples of the polyol (compound having bi- or higher functional alcoholic hydroxyl group) include ethylene glycol, diethylene glycol, polyethylene glycol, propylene glycol, dipropylene glycol, polypropylene glycol, 1,4-butanediol, polytetramethylene glycol, glycerin, trimethylolpropane, and pentaerythritol.

In addition, in an aspect in which the combination of the polyvalent isocyanate and the polyol is included as the thermosetting compound, it is more preferable that the binder precursor contains a reaction promoter which promotes a thermosetting reaction between the polyvalent isocyanate and the polyol. By adding the reaction promoter, the reaction between the isocyanate and the hydroxyl group is promoted, and it is possible to produce a good urethane polymer even at a low temperature. As the reaction promoter, tetraalkylammonium salts, cyclic amidines such as diazabicycloundecene (DBU) and diazabicyclononene (DBN) and salts thereof, cyclic amines such as 1,4-diazabicyclo[2.2.2]octane (DABCO), pyridines, nitrogen atom-containing heteroaromatic compound of imidazoles and salts thereof, alkyltin compounds and salts thereof, alkylzinc compounds and salts thereof, zirconium compounds, titanium compounds, alkylaluminums, or boric acids are preferable.

In addition, a thermocurable resin cyclized and cured by a base, such as a polyimide precursor resin, a polyamidoimide precursor resin, and a polybenzoxazole precursor resin, can also be used.

The curable composition layer may contain only one kind of curable compound or may contain two or more kinds of curable compounds.

In a case where the curable composition layer contains a curable compound, a content of the curable compound is preferably 10% by mass or more and more preferably 25% by mass or more with respect to the total mass of the curable composition layer. The upper limit is not particularly limited, but is preferably 70% by mass or less and more preferably 60% by mass or less.

[Curing Agent]

In a case where the curable composition layer contains an epoxy compound, the curable composition layer may contain an epoxy curing agent.

As the epoxy curing agent, an acid anhydride-based curing agent, a polyamine-based curing agent, a catalytic curing agent, or a polycarboxylic acid-based curing agent is preferable.

Examples of the acid anhydride-based curing agent include maleic acid anhydride, tetrahydrophthalic acid anhydride, hexahydrophthalic acid anhydride, methylhexahydrophthalic acid anhydride, hexahydrotrimellitic acid anhydride, phthalic acid anhydride, trimellitic acid anhydride, and a styrene-maleic acid anhydride copolymer.

Examples of the polyamine-based curing agent include diethylenetriamine, triethylenetetramine, tetraethylenepentamine, dicyandiamide, polyamidoamine (polyamide resin), a ketimine compound, isophoronediamine, m-xylenediamine, m-phenylenediamine, 1,3-bis(aminomethyl)cyclohexane, N-aminoethylpiperazine, 4,4'-diaminodiphenylmethane, 4,4'-diamino-3,3'-diethyldiphenylmethane, and diaminodiphenylsulfone.

Examples of the catalytic curing agent include a tertiary amine compound and an imidazole compound.

Examples of the polycarboxylic acid-based curing agent include phthalic acid anhydride, trimellitic acid anhydride, pyromellitic acid anhydride, tetrahydrophthalic acid anhydride, methyltetrahydrophthalic acid anhydride, 3,6-endomethylenetetrahydrophthalic acid anhydride, hexachlorendomethylenetetrahydrophthalic acid anhydride, and methyl-3,6-endomethylenetetrahydrophthalic acid anhydride.

In a case where the curable composition layer contains a curing agent, a content of the curing agent is preferably 0.001% to 10% by mass and more preferably 0.01% to 5% by mass with respect to the total mass of the curable composition layer.

[Polymerization Initiator]

The curable composition layer may contain a polymerization initiator.

As the polymerization initiator, it is preferable to use a suitable polymerization initiator according to the type of the curable compound, and a light or thermal polymerization initiator is more preferable. The photopolymerization initiator is a compound capable of generating initiating species such as radicals and acids due to decomposition by exposure, and is a compound capable of initiating and accelerating the polymerization reaction of a polymerizable compound with this initiating species.

In addition, the polymerization method may be radical polymerization, cationic polymerization, or anionic polymerization. In a case a highly nucleophilic substance is contained in at least a part of components of the polymerization initiator or in impurities or decomposition products, the polymerization initiator may be adsorbed on a surface of a phosphor, weakening a reaction rate of epoxide, and at the same time, affecting luminous efficacy of the phosphor contained in a phosphor-dispersed composition. Therefore, it is preferable that the polymerization initiator contains a small content of highly nucleophilic components, particularly primary amines and secondary amines.

Examples of the photopolymerization initiator include quinones, aromatic ketones, acetophenones, acylphosphine oxides, benzoins, benzoin ethers, dialkylketals, thioxanthones, dialkylaminobenzoic acid esters, oxime esters, acridines, hexaarylbiimidazoles, pyrazoline derivatives, N-arylamino acids and ester compounds thereof, and halogen compounds. Examples of the quinones include 2-ethylanthraquinone, octaethylanthraquinone, 1,2-benzanthraquinone, 2,3-benzanthraquinone, 2-phenylanthraquinone, 2,3-diphenylanthraquinone, 1-chloroanthraquinone, 2-chloroanthraquinone, 2-methylanthraquinone, 1,4-naphthoquinone, 9,10-phenanthraquinone, 2-methyl-1,4-naphthoquinone, 9,10-phenanthraquinone, 2-methyl-1, 4-naphthoquinone, 2,3-dimethylanthraquinone, and 3-chloro-2-methylanthraquinone.

Examples of the aromatic ketones include benzophenone, Michler's ketone [4,4'-bis(dimethylamino)benzophenone], 4,4'-bis(diethylamino)benzophenone, and 4-methoxy-4'-dimethylaminobenzophenone.

Examples of the acetophenones include 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl (2-hydroxy-2-propyl)ketone, 1-hydroxycyclohexylphenyl ketone, 2-benzyl-2-dimethylamino-1-(4-morpholinophenyl)-butanone-1, and 2-methyl-1-[4-(methylthio)phenyl]-2-morpholino-propanone-1. Examples of a commercially available product thereof include IRGACURE-907, IRGACURE-369, and IRGACURE-379 manufactured by Ciba Specialty Chemicals Inc.

Examples of the acylphosphine oxides include 2,4,6-trimethylbenzyldiphenylphosphine oxide, bis(2,4,6-trimethylbenzoyl)-phosphine oxide, and bis(2,6-dimethoxybenzoyl)-2,4,4-trimethyl-pentylphosphine oxide. Examples of a commercially available product thereof include Lucirin TPO manufactured by BASF and IRGACURE 819 manufactured by Ciba Specialty Chemicals Inc.

Examples of the benzoins or the benzoin ethers include benzoin, benzoin ethyl ether, benzoin phenyl ether, methylbenzoin, and ethylbenzoin.

Examples of the dialkylketals include benzyl dimethyl ketal and benzyl diethyl ketal.

Examples of the thioxanthones include 2,4-diethylthioxanthone, 2,4-diisopropylthioxanthone, and 2-chlorthioxanthone.

Examples of the dialkylaminobenzoic acid esters include ethyl dimethylaminobenzoate, ethyl diethylaminobenzoate, ethyl-p-dimethylaminobenzoate, and 2-ethylhexyl-4-(dimethylamino)benzoate.

Examples of the oxime esters include 1-phenyl-1,2-propanedione-2-O-benzoyloxime and 1-phenyl-1,2-propanedione-2-(O-ethoxycarbonyl)oxime. Examples of a commercially available product thereof include CGI-325, IRGACURE-OXE01, and IRGACURE-OXE02 manufactured by Ciba Specialty Chemicals Inc.

In addition, a photocationic polymerization initiator can also be used as the photopolymerization initiator. For the photocationic polymerization initiator, for example, paragraphs [0019] to [0024] of JP4675719B can be referred to.

Examples of a preferred photocationic polymerization initiator include an iodonium salt compound, a sulfonium salt compound, a pyridinium salt compound, and a phosphonium salt compound. Among these, from the viewpoint of excellent heat stability, an iodonium salt compound or a sulfonium salt compound is preferable.

The iodonium salt compound is a salt formed by a cationic moiety containing I⁺ and an anionic moiety of any structure in its structure, and a diaryliodonium salt having three or more electron-donating groups, at least one of which is an alkoxy group, is more preferable. By introducing the alkoxy group which is the electron-donating group into the diaryliodonium salt in this manner, decomposition due to water or nucleophilic agents over time and electron migration due to heat can be suppressed, whereby improved stability can be expected.

Examples of photocationic polymerization initiators which can be used include one or a combination of two or more of the following commercially available products: CPI-110P (photocationic polymerization initiator C below), CPI-101A, CPI-110P, and CPI-200K, which are manufactured by San-Apro Ltd.; WPI-113, WPI-116, WPI-124, WPI-169, and WPI-170, which are manufactured by Wako Pure Chemical Industries, Ltd.; PI-2074 manufactured by DJK Corporation; and IRGACURE (registered trademark)-250, IRGACURE-270, and IRGACURE-290 (photocationic polymerization initiator D below), which are manufactured by BASF.

Examples of the thermal polymerization initiator include onium salt compounds such as iodonium salt, sulfonium salt, and phosphonium salt; complex salts of boron trifluoride or a Lewis acid compound (for example, zinc halide, tin halide, aluminum halide, iron halide, and the like) and tertiary amines or nitrogen atom-containing heteroaromatics; imidazoles described above; cyclic amidines; and salts of these compounds and an organic acid.

The curable composition layer may contain only one kind of polymerization initiator or may contain two or more kinds of polymerization initiators.

In a case where the curable composition layer contains a polymerization initiator, a content of the polymerization initiator is preferably 0.001% to 10% by mass and more preferably 0.01% to 5% by mass with respect to the total mass of the curable composition layer.

[Heterocyclic Compound]

The curable composition layer may contain a heterocyclic compound.

A heterocyclic ring included in the heterocyclic compound may be either a monocyclic or polycyclic heterocyclic ring.

Examples of a heteroatom included in the heterocyclic compound include an oxygen atom, a nitrogen atom, and a sulfur atom. The heterocyclic compound preferably has at least one atom selected from the group consisting of a nitrogen atom, an oxygen atom, and a sulfur atom, and more preferably has a nitrogen atom.

Examples of the heterocyclic compound include a triazole compound, a benzotriazole compound, a tetrazole compound, a thiadiazole compound, a triazine compound, a rhodanine compound, a thiazole compound, a benzothiazole compound, a benzoimidazole compound, a benzoxazole compound, and a pyrimidine compound (for example, isonicotinamide).

Among the above-described compounds, the heterocyclic compound is preferably at least one compound selected from the group consisting of a triazole compound, a benzotriazole compound, a tetrazole compound, a thiadiazole compound, a triazine compound, a rhodanine compound, a thiazole compound, a benzimidazole compounds, and a benzoxazole compound, and more preferably at least one compound selected from the group consisting of a triazole compound, a benzotriazole compound, a tetrazole compound, a thiadiazole compound, a thiazole compound, a benzothiazole compound, a benzimidazole compound, and a benzoxazole compound.

Preferred specific examples of the heterocyclic compound are shown below. Examples of the triazole compound and the benzotriazole compound include the following compounds.

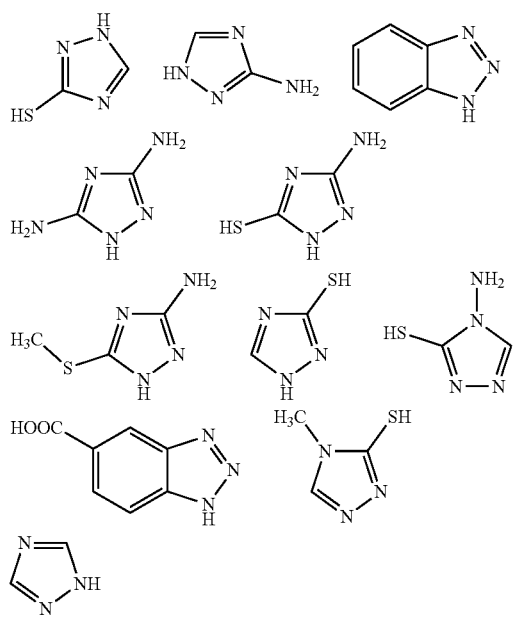

Examples of the tetrazole compound include the following compounds.

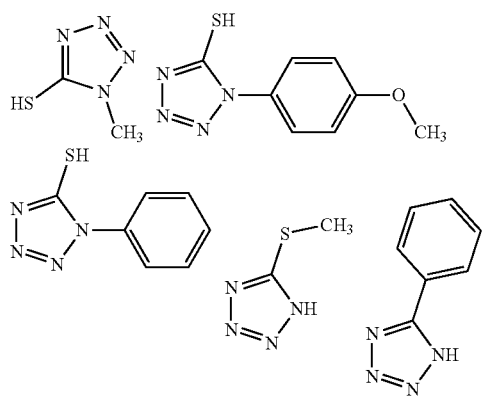

Examples of the thiadiazole compound include the following compounds.

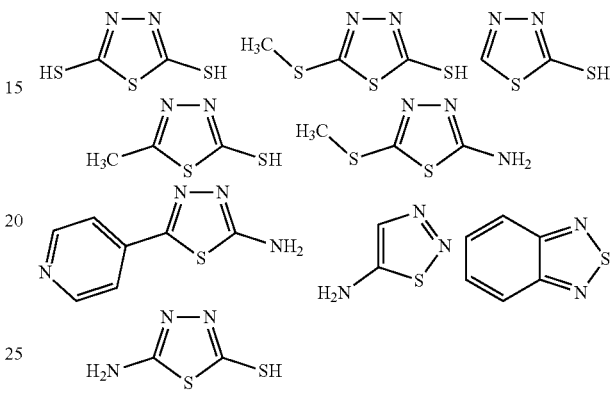

Examples of the triazine compound include the following compounds.

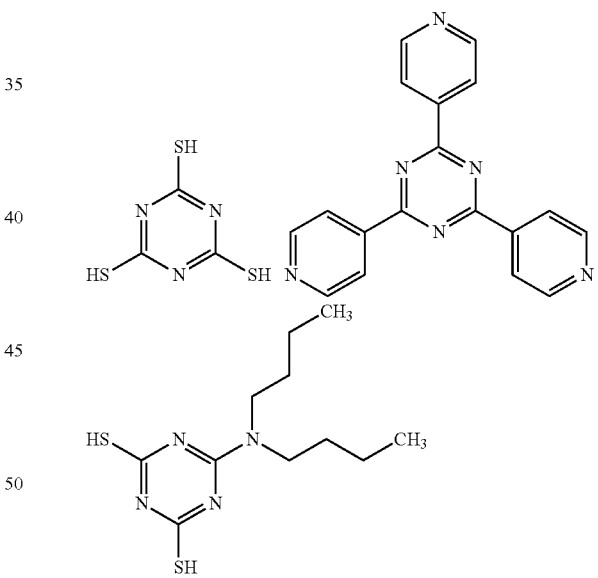

Examples of the rhodanine compound include the following compounds.

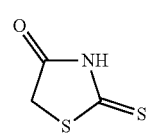

Examples of the thiazole compound include the following compounds.

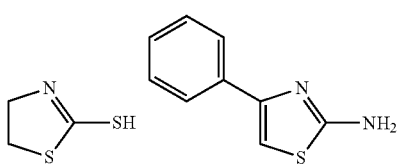

Examples of the benzothiazole compound include the following compounds.

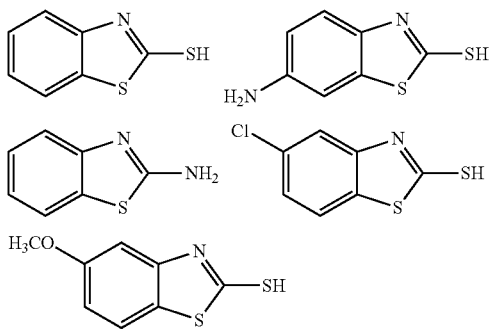

Examples of the benzimidazole compound include the following compounds.

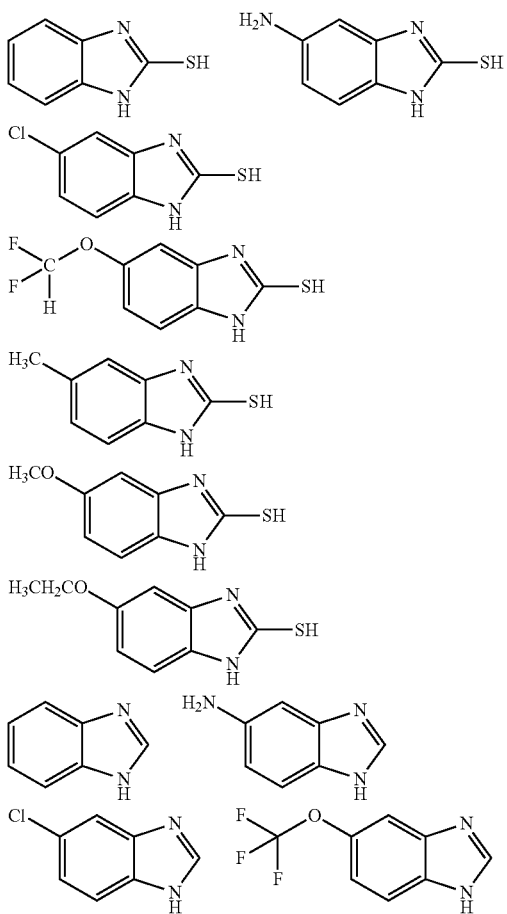

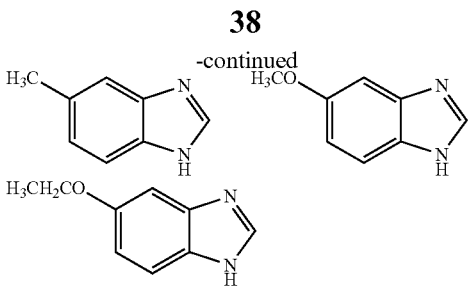

Examples of the benzoxazole compound include the following compounds.

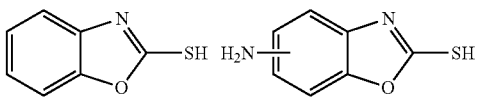

The curable composition layer may contain only one kind of heterocyclic compound or may contain two or more kinds of heterocyclic compounds.

In a case where the curable composition layer contains a heterocyclic compound, a content of the heterocyclic compound is preferably 0.01% to 20% by mass and more preferably 0.1% to 10% by mass with respect to the total mass of the curable composition layer.

[Blocked Isocyanate]

The curable composition layer may contain a blocked isocyanate.

The blocked isocyanate compound refers to a "compound having a structure in which the isocyanate group of isocyanate is protected (so-called masked) with a blocking agent".

A dissociation temperature of the blocked isocyanate compound is not particularly limited, but is preferably 100° C. to 160° C. and more preferably 130° C. to 150° C.

The dissociation temperature of blocked isocyanate means "temperature at an endothermic peak accompanied with a deprotection reaction of blocked isocyanate, in a case where the measurement is performed by differential scanning calorimetry (DSC) analysis using a differential scanning calorimeter".

As the differential scanning calorimeter, for example, a differential scanning calorimeter (model: DSC6200) manufactured by Seiko Instruments Inc. can be suitably used. However, the differential scanning calorimeter is not limited thereto.

Examples of the blocking agent having a dissociation temperature of 100° C. to 160° C. include an active methylene compound [diester malonates (dimethyl malonate, diethyl malonate, di-n-butyl malonate, di-2-ethylhexyl malonate, and the like)], and an oxime compound (compound having a structure represented by —C(=N—OH)— in a molecule, such as formaldoxime, acetaldoxime, acetoxime, methyl ethyl ketoxime, and cyclohexanoneoxime).

Among these, from the viewpoint of storage stability, the blocking agent having a dissociation temperature of 100° C. to 160° C. is preferably, for example, at least one selected from oxime compounds.

From the viewpoint of improving brittleness of the film and improving the adhesion to the object to be transferred, for example, the blocked isocyanate compound preferably has an isocyanurate structure.

The blocked isocyanate compound having an isocyanurate structure can be obtained, for example, by isocyanurate-forming and protecting hexamethylene diisocyanate.

Among the blocked isocyanate compounds having an isocyanurate structure, a compound having an oxime structure using an oxime compound as a blocking agent is preferable from the viewpoint that the dissociation temperature can be easily set in a preferred range and the development residue can be easily reduced, as compared with a compound having no oxime structure.

The blocked isocyanate compound may have a polymerizable group.

The polymerizable group is not particularly limited, and a known polymerizable group can be used, and a radically polymerizable group is preferable.

Examples of the polymerizable group include a (meth)acryloxy group, a (meth)acrylamide group, an ethylenically unsaturated group such as styryl group, and an epoxy group such as a glycidyl group.

Among these, as the polymerizable group, an ethylenically unsaturated group is preferable, a (meth)acryloxy group is more preferable, and an acryloxy group still more preferable.

As the blocked isocyanate compound, a commercially available product can be used.

Examples of the commercially available product of the blocked isocyanate compound include Karenz (registered trademark) AOI-BM, Karenz (registered trademark) MOI-BM, Karenz (registered trademark) MOI-BP, and the like (all of which are manufactured by SHOWA DENKO K.K.), and block-type DURANATE series (for example, DURANATE (registered trademark) TPA-B80E, DURANATE (registered trademark) WT32-B75P, and the like manufactured by Asahi Kasei Corporation).

In addition, as the blocked isocyanate compound, a compound having the following structure can also be used.

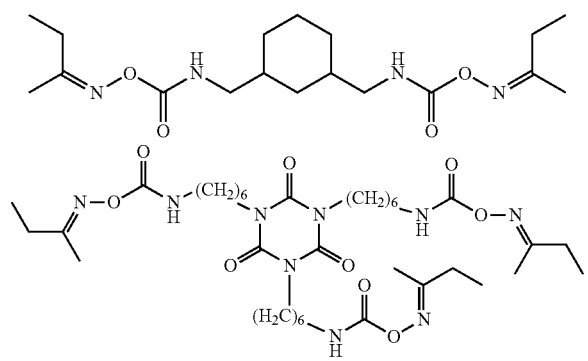

The curable composition layer may contain only one kind of blocked isocyanate or may contain two or more kinds of blocked isocyanates.

In a case where the curable composition layer contains a blocked isocyanate, a content of the blocked isocyanate in the curable composition layer is preferably 1% to 50% by mass and more preferably 5% to 30% by mass with respect to the total mass of the curable composition layer.

[Aliphatic Thiol Compound]

The curable composition layer may contain an aliphatic thiol compound.

In a case where the curable composition layer contains an aliphatic thiol compound, an ene-thiol reaction of the aliphatic thiol compound with the radically polymerizable compound having an ethylenically unsaturated group suppresses a curing contraction of the formed film and relieves stress.

As the aliphatic thiol compound, a monofunctional aliphatic thiol compound or a polyfunctional aliphatic thiol compound (that is, bi- or higher functional aliphatic thiol compound) is preferable.

Among these, as the aliphatic thiol compound, for example, from the viewpoint of adhesiveness (in particular, adhesiveness after exposure) of the pattern to be formed, a polyfunctional aliphatic thiol compound is preferable.

In the present disclosure, the "polyfunctional aliphatic thiol compound" refers to an aliphatic compound having two or more thiol groups (also referred to as "mercapto groups") in a molecule.

As the polyfunctional aliphatic thiol compound, a low-molecular-weight compound having a molecular weight of 100 or more is preferable. Specifically, the molecular weight of the polyfunctional aliphatic thiol compound is more preferably 100 to 1,500 and still more preferably 150 to 1,000.

From the viewpoint of adhesiveness of the formed pattern, for example, the number of functional groups in the polyfunctional aliphatic thiol compound is preferably 2 to 10, more preferably 2 to 8, and still more preferably 2 to 6.

Examples of the polyfunctional aliphatic thiol compound include trimethylolpropane tris(3-mercaptobutyrate), 1,4-bis(3-mercaptobutyryloxy)butane, pentaerythritol tetrakis(3-mercaptobutyrate), 1,3,5-tris(3-mercaptobutyryloxyethyl)-1,3,5-triazine-2,4,6(1H,3H,5H)-trione, trimethylolethane tris(3-mercaptobutyrate), tris[(3-mercaptopropionyloxy)ethyl] isocyanurate, trimethylolpropane tris(3-mercaptopropionate), pentaerythritol tetrakis(3-mercaptopropionate), tetraethylene glycol bis(3-mercaptopropionate), dipentaerythritol hexakis(3-mercaptopropionate), ethylene glycol bisthiopropionate, 1,2-ethanedithiol, 1,3-propanedithiol, 1,6-hexamethylenedithiol, 2,2'-(ethylenedithio)diethanethiol, meso-2,3-dimercaptosuccinic acid, and di(mercaptoethyl) ether.

Among the above-described compounds, the polyfunctional aliphatic thiol compound is preferably at least one compound selected from the group consisting of trimethylolpropane tris(3-mercaptobutyrate), 1,4-bis(3-mercaptobutyryloxy)butane, and 1,3,5-tris(3-mercaptobutyryloxyethyl)-1,3,5-triazine-2,4,6(1H,3H,5H)-trione.

Examples of the monofunctional aliphatic thiol compound include 1-octanethiol, 1-dodecanethiol, β-mercaptopropionic acid, methyl-3-mercaptopropionate, 2-ethylhexyl-3-mercaptopropionate, n-octyl-3-mercaptopropionate, methoxybutyl-3-mercaptopropionate, and stearyl-3-mercaptopropionate.

The curable composition layer may contain only one kind of aliphatic thiol compound or may contain two or more kinds of aliphatic thiol compounds.

In the case where the curable composition layer contains an aliphatic thiol compound, a content of the aliphatic thiol compound is preferably 5% by mass or more, more preferably 5 to 50% by mass, still more preferably 5 to 30% by mass, and particularly preferably 8 to 20% by mass with respect to the total mass of the curable composition layer.

[Surfactant]

The curable composition layer may contain a surfactant.

Examples of the surfactant include surfactants described in paragraph [0017] of [0200] JP4502784B and paragraphs [0060] to [0071] of JP2009-237362A.

As the surfactant, a fluorine-based surfactant or a silicon-based surfactant is preferable. Examples of a commercially available product of the fluorine-based surfactant include: MEGAFACE F-171, F-172, F-173, F-176, F-177, F-141, F-142, F-143, F-144, F-437, F-475, F-477, F-479, F-482, F-551-A, F-552, F-554, F-555-A, F-556, F-557, F-558, F-559, F-560, F-561, F-565, F-563, F-568, F-575, F-780, EXP, MFS-330, EXP.MFS-578, EXP.MFS-578-2, EXP.MFS-579, EXP.MFS-586, EXP.MFS-587, EXP.MFS-628, EXP.MFS-631, EXP-MFS-603, R-41, R-41-LM, R-01, R-40, R-40-LM, RS-43, TF-1956, RS-90, R-94, RS-72-K, and DS-21 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMNOVA Solutions Inc.); FTERGENT 710FL, 710FM, 610FM, 601AD, 601ADH2, 602A, 215M, 245F, 251, 212M, 250, 209F, 222F, 208G, 710LA, 710FS, 730LM, 650AC, 681, and 683 (all of which are manufactured by NEOS COMPANY LIMITED); and U-120E (manufactured by Uni-chem Co., Ltd.).

In addition, as the fluorine-based surfactant, an acrylic compound, which has a molecular structure having a functional group containing a fluorine atom and in which, by applying heat to the molecular structure, the functional group containing a fluorine atom is broken to volatilize a fluorine atom, can also be suitably used. Examples of such a fluorine-based surfactant include MEGAFACE DS series manufactured by DIC Corporation (The Chemical Daily (Feb. 22, 2016) and Nikkei Business Daily (Feb. 23, 2016)), for example, MEGAFACE DS-21.

In addition, as the fluorine-based surfactant, a polymer of a fluorine atom-containing vinyl ether compound having a fluorinated alkyl group or a fluorinated alkylene ether group, and a hydrophilic vinyl ether compound is also preferably used.

In addition, as the fluorine-based surfactant, a block polymer can also be used.

In addition, as the fluorine-based surfactant, a fluorine-containing polymer compound including a constitutional unit derived from a (meth)acrylate compound having a fluorine atom and a constitutional unit derived from a (meth)acrylate compound having 2 or more (preferably 5 or more) alkyleneoxy groups (preferably ethyleneoxy groups or propyleneoxy groups) can also be preferably used.

In addition, as the fluorine-based surfactant, a fluorine-containing polymer having an ethylenically unsaturated bond-containing group in the side chain can also be used. Examples thereof include MEGAFACE RS-101, RS-102, RS-718K, and RS-72-K (all manufactured by DIC Corporation).

As the fluorine-based surfactant, from the viewpoint of improving environmental suitability, a surfactant derived from a substitute material for a compound having a linear perfluoroalkyl group having 7 or more carbon atoms, such as perfluorooctanoic acid (PFOA) and perfluorooctanesulfonic acid (PFOS), is preferable.

Examples of a hydrocarbon-based surfactant include glycerol, trimethylolpropane, trimethylolethane, and ethoxylate and propoxylate thereof (for example, glycerol propoxylate, glycerol ethoxylate, and the like), polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid ester.

Specific examples thereof include PLURONIC L10, L31, L61, L62, 10R5, 17R2, and 25R2, TETRONIC 304, 701, 704, 901, 904, and 150R1, and HYDROPALAT WE 3323 (all of which are manufactured by BASF); SOLSPERSE 20000 (manufactured by Lubrizol Corporation); NCW-101, NCW-1001, and NCW-1002 (all of which are manufactured by FUJIFILM Wako Pure Chemical Corporation); PIONIN D-1105, D-6112, D-6112-W, and D-6315 (all of which are manufactured by Takemoto Oil&Fat Co., Ltd.); and OLFINE E1010 and SURFYNOL 104, 400, and 440 (all of which are manufactured by Nissin Chemical Co., Ltd.).

Examples of the silicone-based surfactant include a linear polymer consisting of a siloxane bond and a modified siloxane polymer with an organic group introduced in the side chain or the terminal.

Specific examples of the silicone-based surfactant include EXP.S-309-2, EXP.S-315, EXP.S-503-2, and EXP.S-505-2 (all of which are manufactured by DIC Corporation); DOWSIL 8032 ADDITIVE, TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all of which are manufactured by Dow Corning Toray Co., Ltd.); X-22-4952, X-22-4272, X-22-6266, KF-351A, K354L, KF-355A, KF-945, KF-640, KF-642, KF-643, X-22-6191, X-22-4515, KF-6004, KF-6001, KF-6002, KP-101, KP-103, KP-104, KP-105, KP-106, KP-109, KP-112, KP-120, KP-121, KP-124, KP-125, KP-301, KP-306, KP-310, KP-322, KP-323, KP-327, KP-341, KP-368, KP-369, KP-611, KP-620, KP-621, KP-626, and KP-652 (all of which are manufactured by Shin-Etsu Silicone Co., Ltd.); F-4440, TSF-4300, TSF-4445, TSF-4460, and TSF-4452 (all of which are manufactured by Momentive Performance Materials Co., Ltd.); and BYK300, BYK306, BYK307, BYK310, BYK320, BYK323, BYK325, BYK330, BYK313, BYK315N, BYK331, BYK333, BYK345, BYK347, BYK348, BYK349, BYK370, BYK377, and BYK378 (all of which are manufactured by BYK Chemie).

The curable composition layer may contain only one kind of surfactant or may contain two or more kinds of surfactants.

In a case where the curable composition layer contains a surfactant, a content of the surfactant is preferably 0.01% to 3% by mass, more preferably 0.05% to 1% by mass, and still more preferably 0.1% to 0.8% by mass with respect to the total mass of the curable composition layer.

[Hydrogen-Donating Compound]

The curable composition layer may contain a hydrogen-donating compound.

The hydrogen-donating compound has a function of further improving sensitivity of the photopolymerization initiator to actinic ray, suppressing inhibition of polymerization of the polymerizable compound by oxygen, or the like.

Examples of such a hydrogen-donating compound include amines, for example, compounds described in M. R. Sander et al., "Journal of Polymer Society," Vol. 10, page 3173 (1972), JP1969-020189B (JP-S44-020189B), JP1976-082102A (JP-S51-082102A), JP1977-134692A (JP-S52-134692A), JP1984-138205A (JP-S59-138205A), JP1985-084305A (JP-S60-084305A), JP1987-018537A (JP-S62-018537A), JP1989-033104A (JP-S64-033104A), and Research Disclosure 33825.

Specific examples of the hydrogen-donating compound include triethanolamine, p-dimethylaminobenzoic acid ethyl ester, p-formyldimethylaniline, and p-methylthiodimethylaniline.

In addition, examples of the hydrogen-donating compound also include an amino acid compound (N-phenylglycine and the like), an organic metal compound described in JP1973-042965B (JP-S48-042965B) (tributyl tin acetate and the like), a hydrogen donor described in JP1980-034414B (JP-S55-034414B), and a sulfur compound described in JP1994-308727A (JP-H6-308727A) (trithiane and the like).

The curable composition layer may contain only one kind of hydrogen-donating compound or may contain two or more kinds of hydrogen-donating compounds.

In a case where the curable composition layer contains a hydrogen-donating compound, from the viewpoint of improving a curing rate by balancing the polymerization growth rate and chain transfer, a content of the hydrogen-donating compound is preferably 0.01% to 10% by mass, more preferably 0.03% to 5% by mass, and still more preferably 0.05% to 3% by mass with respect to the total mass of the curable composition layer.

[Other Components]

The curable composition layer may contain a component (hereinafter, also referred to as "other components") other than the above-described components. Examples of the other components include particles (for example, metal oxide particles) and a colorant.

In addition, examples of the other components include a thermal polymerization inhibitor described in paragraph [0058] of JP4502784B and other additives described in paragraphs [0058] to [0071] of JP2000-310706A.

The curable composition layer may contain particles for the purpose of adjusting refractive index, light-transmitting property, and the like. Examples of the particles include metal oxide particles.

The metal of the metal oxide particles also includes semimetal such as B, Si, Ge, As, Sb, or Te.

From a viewpoint of transparency of a pattern, an average primary particle diameter of the particles is, for example, preferably 1 to 200 nm, and more preferably 3 to 80 nm. The average primary particle diameter of the particles is calculated by measuring particle diameters of 200 random particles using an electron microscope and arithmetically averaging the measurement result. In a case where the shape of the particle is not a spherical shape, the longest side is set as the particle diameter.

The curable composition layer may contain only one kind of particles or may contain two or more kinds of particles. In a case where the curable composition layer contain particles, the curable composition layer may contain only one kind of particles having different metal types, sizes, and the like, or may contain two or more kinds thereof.

It is preferable that the curable composition layer does not contain particles, or the content of the particles is more than 0% by mass and 35% by mass or less with respect to the total mass of the curable composition layer; it is more preferable that the curable composition layer does not contain particles, or the content of the particles is more than 0% by mass and 10% by mass or less with respect to the total mass of the curable composition layer; it is still more preferable that the curable composition layer does not contain particles, or the content of the particles is more than 0% by mass and 5% by mass or less with respect to the total mass of the curable composition layer; it is particularly preferable that the curable composition layer does not contain particles, or the content of the particles is more than 0% by mass and 1% by mass or less with respect to the total mass of the curable composition layer; and it is the most preferable that the curable composition layer does not contain particles.

The curable composition layer may contain a trace amount of a colorant (for example, a pigment and a dye), but for example, from the viewpoint of transparency, it is preferable that the curable composition layer does not substantially contain the colorant.

In a case where the curable composition layer contains a colorant, a content of the colorant is preferably less than 1% by mass and more preferably less than 0.1% by mass with respect to the total mass of the curable composition layer.

[Impurities and the Like]

The curable composition layer may contain a predetermined amount of impurities.

Specific examples of the impurities include sodium, potassium, magnesium, calcium, iron, manganese, copper, aluminum, titanium, chromium, cobalt, nickel, zinc, tin, halogen, and ions of these metals. Among these, halide ion, sodium ion, and potassium ion are easily mixed as impurities, so that the following content is preferable.

A content of impurities in the curable composition layer is preferably 80 ppm or less, more preferably 10 ppm or less, and particularly preferably 2 ppm or less on a mass basis. The content of the impurities in the curable composition layer may be 1 ppb or more or 0.1 ppm or more on a mass basis.

Examples of a method of setting the impurities in the above-described range include selecting a raw material having a low content of impurities as a raw material for the curable composition layer, preventing the impurities from being mixed in a case of forming the curable composition layer, and washing and removing the impurities. By such a method, the amount of impurities can be kept within the above-described range.

The impurities can be quantified by a known method such as inductively coupled plasma (ICP) emission spectroscopy, atomic absorption spectroscopy, and ion chromatography.

In the curable composition layer, it is preferable that the content of compounds such as benzene, formaldehyde, trichlorethylene, 1,3-butadiene, carbon tetrachloride, chloroform, N,N-dimethylformamide, N,N-dimethylacetamide, and hexane is low in each layer. The content of these compounds in the curable composition layer is preferably 100 ppm or less, more preferably 20 ppm or less, and particularly preferably 4 ppm or less on a mass basis. The lower limit thereof may be 10 ppb or more or 100 ppb or more on a mass basis. The content of these compounds can be suppressed in the same manner as in the above-described metal as impurities. In addition, the compounds can be quantified by a known measurement method.

From the viewpoint of reliability and laminating property, the content of water in the curable composition layer is preferably 0.01% to 1.0% by mass and more preferably 0.05% to 0.5% by mass.

[Thickness of Curable Composition Layer]

From the viewpoint of coating properties, an upper limit value of a thickness of the curable composition layer is preferably 20.0 μm or less, more preferably 15.0 μm or less, and still more preferably 12.0 μm or less.

A lower limit value of the thickness of the curable composition layer is preferably 0.05 μm or more.

The thickness of the curable composition layer is obtained as an average value at 5 random points measured by cross-section observation with a scanning electron microscope (SEM).

[Color of Curable Composition Layer]

The curable composition layer is preferably achromatic. The a* value of the curable composition layer is preferably −1.0 to 1.0, and the b* value of the curable composition layer is preferably −1.0 to 1.0.

The hue of the curable composition layer can be measured using a colorimeter (CR-221, manufactured by Minolta Co., Ltd.).

[Method for Manufacturing Transfer Film]

A method for manufacturing the transfer film is not particularly limited, and known methods can be used.

Among these, a method of applying a curable composition onto a temporary support and performing a drying treatment as necessary to form a curable composition layer (hereinafter, this method is referred to as "coating method") is preferable from the viewpoint that the productivity is excellent.

The curable composition used in the coating method preferably includes the above-described components (for example, the polymerizable compound, the polymer, the heterocyclic compound, the polymerization initiator, the blocked isocyanate compound, and the like) constituting the curable composition layer, and a solvent.

As the solvent, an organic solvent is preferable. Examples of the organic solvent include methyl ethyl ketone, propylene glycol monomethyl ether, propylene glycol monomethyl ether acetate (another name: 1-methoxy-2-propyl acetate), diethylene glycol ethyl methyl ether, cyclohexanone, methyl isobutyl ketone, ethyl lactate, methyl lactate, caprolactam, n-propanol, and 2-propanol. As the solvent, a mixed solvent of methyl ethyl ketone and propylene glycol monomethyl ether acetate or a mixed solvent of diethylene glycol ethyl methyl ether and propylene glycol monomethyl ether acetate is preferable.

In addition, as the solvent, an organic solvent (high-boiling-point solvent) having a boiling point of 180° C. to 250° C. can also be used, as necessary.

The curable composition may contain only one kind of solvent or may contain two or more kinds of solvents.

In a case where the curable composition contains a solvent, the total solid content of the curable composition is preferably 5% to 80% by mass, more preferably 5% to 40% by mass, and still more preferably 5% to 30% by mass with respect to the total mass of the curable composition.

In a case where the curable composition contains the solvent, for example, from the viewpoint of coating properties, a viscosity of the curable composition at 25° C. is preferably 1 to 50 mPa's, more preferably 2 to 40 mPa's, and still more preferably 3 to 30 mPa·s. The viscosity is measured using a viscometer. As the viscometer, for example, a viscometer (product name: VISCOMETER TV-22) manufactured by Toki Sangyo Co., Ltd. can be suitably used. However, the viscometer is not limited to the above-described viscometer.

In a case where the curable composition contains the solvent, from the viewpoint of coating properties, a surface tension of the curable composition at 25° C. is preferably 5 to 100 mN/m, more preferably 10 to 80 mN/m, and still more preferably 15 to 40 mN/m. The surface tension is measured using a tensiometer. As the tensiometer, for example, a tensiometer (product name: Automatic Surface Tensiometer CBVP-Z) manufactured by Kyowa Interface Science Co., Ltd. can be suitably used. However, the tensiometer is not limited to the above-described tensiometer.

Examples of a method for applying the curable composition include a printing method, a spray coating method, a roll coating method, a bar coating method, a curtain coating method, a spin coating method, and a die coating method (that is, a slit coating method).

Examples of the drying method include natural drying, heating drying, and drying under reduced pressure. The above-described methods can be adopted alone or in combination of two or more thereof.

In the present disclosure, the "drying" means removing at least part of the solvent included in the composition.

In addition, in a case where the transfer film includes a protective film, the transfer film can be manufactured by bonding the protective film to the curable composition layer.

A method of bonding the protective film to the curable composition layer is not particularly limited, and examples thereof include known methods.

Examples of a device for bonding the protective film to the curable composition layer include known laminators such as a vacuum laminator and an auto-cut laminator.

It is preferable that the laminator is equipped with any heatable roller such as a rubber roller and can perform pressing and heating.

Second embodiment

A second embodiment of the laminate according to the present invention will be described with reference to the drawing.

Figure 3:
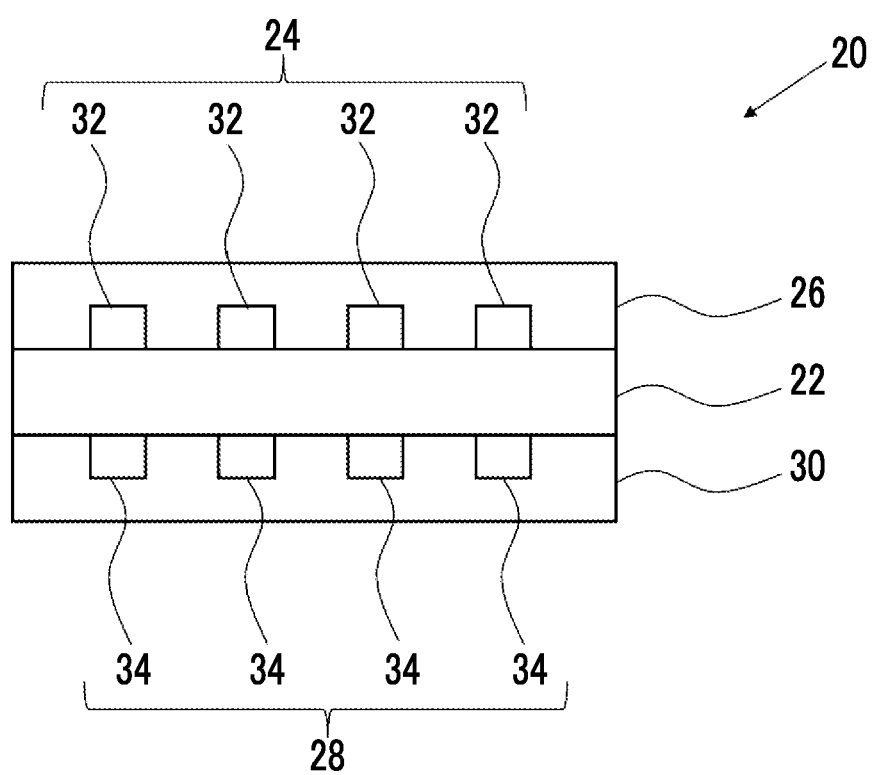
FIG. 3 is a schematic view showing an example of a layer configuration of a second embodiment of the laminate according to the present invention.

A laminate 20 shown in FIG. 3 includes a dielectric film 22, a first metal pattern 24 disposed on one surface side of the dielectric film 22, a first organic film 26 disposed on the first metal pattern 24, a second metal pattern 28 disposed on the other surface side of the dielectric film 22, and a second organic film 30 disposed on the second metal pattern 28.

As shown in FIG. 3, the first metal pattern 24 is constituted of a plurality of first metal structures 32, and the second metal pattern 28 is constituted of a plurality of second metal structures 34.

In the laminate 20, the first metal pattern 24 and the second metal pattern 28 constitute a resonator with respect to electromagnetic waves in a terahertz band. More specifically, resonance occurs with respect to electromagnetic waves in the terahertz band between the first metal structure 32 in the first metal pattern 24 and the second metal structure 34 in the second metal pattern 28, and the first metal structure 32 and the second metal structure 34 can function as one resonator.

In the laminate 20, the first metal pattern 24 and the second metal pattern 28 constitute a resonator with respect to electromagnetic waves in a terahertz band. More specifically, resonance occurs with respect to electromagnetic waves in the terahertz band between the first metal structure 32 in the first metal pattern 24 and the second metal structure 34 in the second metal pattern 28, and the first metal structure 32 and the second metal structure 34 can function as one resonator.

The dielectric film included in the second embodiment is the same member as the dielectric film included in the first embodiment, and the description thereof will be omitted.

In addition, the first organic film and the second organic film included in the second embodiment are the same members as the organic film included in the first embodiment, and the description thereof will be omitted.

Examples of various characteristics such as shape, size, and material of the first metal structure constituting the first metal pattern and the second metal structure constituting the second metal pattern, which are included in the second embodiment, include the various characteristics described in the metal structure constituting the metal pattern, which is included in the first embodiment.

From the viewpoint of resonance with respect to electromagnetic waves in the terahertz band, it is preferable that at least a part of the first metal structure included in the first metal pattern and the second metal structure included in the second metal pattern are arranged to be overlapped with each other in a case where the laminate is seen in a plan view.

In addition, in the plan view of the laminate, the first metal structure included in the first metal pattern and the second metal structure included in the second metal pattern may be arranged so as not to be overlapped with each other, but a deviation thereof is preferably 20 µm or less.

<Method for Manufacturing Laminate>

A method for manufacturing the laminate according to the second embodiment is not particularly limited, but a method including a step 1B of bonding a film with a metal pattern (hereinafter, also simply referred to as "film B with a metal pattern"), that includes a dielectric film, a first metal pattern composed of a plurality of first metal structures, which is disposed on one surface side of the dielectric film, and a second metal pattern composed of a plurality of second metal structures, which is disposed on the other surface side of the dielectric film, where the first metal pattern and the second metal pattern form a resonator with respect to electromagnetic waves in a terahertz band, to a transfer film including a temporary support and a curable composition layer to form a precursor film including the temporary support, the curable composition layer, the first metal pattern, the dielectric film, the second metal pattern, the curable composition layer, and the temporary support in this order; and a step 2B of subjecting the curable composition layers to a curing treatment to obtain organic films, in which a step 3B of peeling off the temporary supports is provided between the step 1B and the step 2B or after the step 2B, is preferable.

Hereinafter, the above-described manufacturing method will be described in detail.

(Film B With Metal Pattern)

In the above-described method, the film B with a metal pattern is used.

A configuration of the metal pattern included in the film B with a metal pattern is the same as the configuration of the metal pattern in the laminate described above.

A method for manufacturing the above-described film B with a metal pattern is not particularly limited, and the film B with a metal pattern can be manufactured by forming metal layers on both surfaces of the dielectric film, disposing predetermined resist patterns on the metal layers, etching away the metal layers not covered with the resist pattern, and peeling off the resist pattern.

(Step 1B)

The step 1B is a step of bonding the film B with a metal pattern to a transfer film including a temporary support and a curable composition layer to form a precursor film including the temporary support, the curable composition layer, the first metal pattern, the dielectric film, the second metal pattern, the curable composition layer, and the temporary support in this order.

In this step, two transfer films are prepared, and the transfer films are bonded to both surfaces of the film B with a metal pattern.

Examples of the bonding method include the method described in the above-described step 1A.

(Step 2B)

The step 2B is a step of subjecting the curable composition layers to a curing treatment to obtain organic films.

By performing this step, the first organic film is formed on the first metal pattern, and the second organic film is formed on the second metal pattern.

Examples of the method of the curing treatment include the method described in the above-described step 2A.

(Step 3B)

The step 3B is a step of peeling off the temporary supports between the step 1B and the step 2B or after the step 2B.

The peeling method is not particularly limited, and the same mechanism as the cover film peeling mechanism described in paragraphs [0161] and [0162] of JP2010-072589A can be used.

Applications

The laminate according to the embodiment of the present invention can be applied to various applications. In particular, the laminate according to the embodiment of the present invention is preferably used as a sheet-shaped member included in an optical element. That is, the optical element according to the embodiment of the present invention includes the above-described laminate.

Examples of the optical element include a flat lens, a diffraction grating, a wavelength filter, a polarizer, and a sensor.

A size of the laminate is not particularly limited, and an optimal size is appropriately selected according to the application. For example, an area of the laminate is preferably 1 $cm^2$ or more and more preferably 5 $cm^2$ or more.

EXAMPLES

Hereinafter, the features of the present invention will be more specifically described using Examples and Comparative Examples. The materials, the amounts and proportions of the materials used, the details of treatments, the procedure of treatments, and the like shown in the following Examples can be appropriately modified as long as the gist of the present invention is maintained. Accordingly, the scope of the present invention should not be construed as being limited by the specific examples given below.

In addition, in Examples, a weight-average molecular weight of a resin is a weight-average molecular weight obtained by performing polystyrene conversion of a value measured by gel permeation chromatography (GPC). Furthermore, a theoretical acid value was used as the acid value.

<Manufacturing of Film With Metal Pattern>

(Film 1 With Metal Pattern)

A COP film was produced by the method described in JP4991170B. A thickness of the COP film was 50 µm.

Next, surfaces of the COP films were subjected to ultrasonic cleaning (45 kHz), and the films cut into a 10 cm size were placed inside a sputtering film-forming apparatus. After reducing the pressure inside the apparatus, argon gas was introduced, and sputtering was carried out using Cu as a target. A copper layer having a thickness of 50 nm was formed on both surfaces one by one in order.

Next, a photosensitive transfer member (negative tone transfer material 1) described in JP2020-204757A was unwound, and a cover film was peeled off from the photosensitive transfer member. Next, the photosensitive transfer member and the COP film on which the copper layer had been disposed were bonded to each other such that the photosensitive resin layer exposed by the peeling of the cover film and the copper layer were in contact with each other, thereby obtaining a laminate. This bonding step was performed under the conditions of a roll temperature of 100° C., a linear pressure of 1.0 MPa, and a linear speed of 4.0 m/min.

Figure 4:
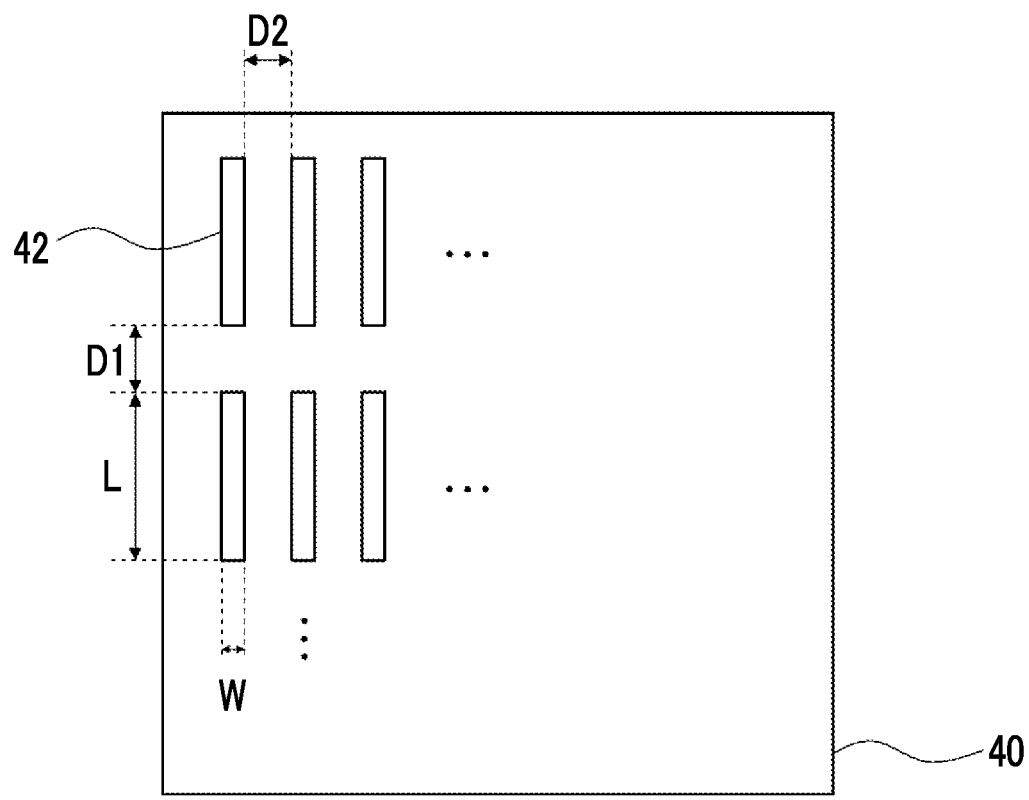
FIG. 4 is a schematic view showing a photo mask used in Examples.

The photosensitive resin layer was exposed by irradiating the obtained laminate from the temporary support side on both surfaces with an ultra-high pressure mercury lamp (exposure main wavelength: 365 nm) at 100 mJ/cm² through a photo mask shown in FIG. 4.

In a photo mask 40 shown in FIG. 4, a plurality of rectangular opening portions 42 were arranged at equal intervals in a width direction and a length direction. The opening portion 42 had a length L of 313 μm and a width W of 54 μm. A distance DI between opening portions in the length direction of the opening portion was 94 μm, and a distance D2 between opening portions in the width direction of the opening portion was 86 μm.

After peeling off the temporary supports on both surfaces from the exposed laminate, the laminate was subjected to a shower development for 30 seconds using a 1.0% sodium carbonate aqueous solution with a liquid temperature of 25° C. to form a resist pattern on the copper layer.

Next, the obtained laminate was etched at 23° C. for 30 seconds using a copper etchant (Cu-02; manufactured by KANTO KAGAKU), and by peeling off the resist pattern using propylene glycol monomethyl ether acetate, a film 1 with a metal pattern, in which copper patterns were patterned on the front and back surfaces, was obtained. Transmission characteristics of the obtained film 1 with a metal pattern were measured using terahertz time-domain spectroscopy (THz-TDS). A sample was fixed to an aperture of φ10 mm (NA to ⅙) and irradiated with a terahertz beam in an environment at a temperature of 25° C. and a humidity of 20%. A polarization direction was made to coincide with a major axis direction of the pattern. A steep valley (recess) of the transmittance and phase inversion were observed near 320 GHz, and it was found that resonance of the metal patterns arranged on both surfaces of the COP film occurred.

(Film 2 With Metal Pattern)

A film 2 with a metal pattern was manufactured according to the same procedure as in (Film 1 with metal pattern) above, except that a COP film with silver layers arranged on both surfaces was used instead of the COP film with copper layers arranged on both surfaces. Transmission characteristics of the metal patterns arranged on both surfaces of the COP film in the obtained film 2 with a metal pattern were measured by the same method as in the case of the film 1 with a metal pattern, and it was confirmed that resonance occurred with respect to electromagnetic waves in the terahertz band.

The COP film with silver layers arranged on both surfaces was manufactured by the following method.

The surfaces of the COP film were subjected to ultrasonic cleaning (45 kHz), and then a conductive metal nanoink DryCure Ag-J (10% by mass aqueous solution of silver nanoparticles) manufactured by C-INK Co., Ltd. was applied onto both surfaces of the COP film, and heated at 120° C. for 60 minutes to obtain the silver layers.

<Binder Polymer>

Resins P-100 and P-101 including a constitutional unit derived from each compound shown in Table 1 were prepared.

Table 1 shows the amount (% by mass) of the constitutional unit in each synthesized resin, the weight-average molecular weight (Mw), the dispersity, and the acid value.

In Table 1, each abbreviation is as follows.

St: styrene

MAA-GMA: constitutional unit obtained by adding glycidyl methacrylate to a constitutional unit derived from methacrylic acid MAA: methacrylic acid DCPMA: dicyclopentanyl methacrylate MMA: methyl methacrylate The repeating unit represented by GMA-MAA above is represented by the following formula.

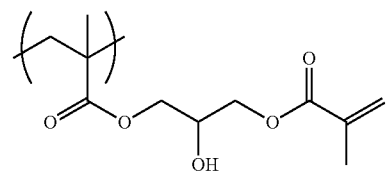

TABLE 1

|  |  | P-100 | P-101 |
|---|---|---|---|
| Constitutional unit (% by mass) | St | 50 | 30 |
|  | MAA-GMA | 32 | 32 |
|  | MAA | 2 | 15.5 |
|  | DCPMA |  | 22.5 |
|  | MMA | 16 |  |
| Weight-average molecular weight Mw |  | 20000 | 30000 |
| Dispersity |  | 2.3 | 2.4 |
| Acid value [mgKOH/g] |  | 13 | 101 |

<Synthesis of Blocked Isocyanate Compound Q-1>

Under a nitrogen stream, 453 g of butanone oxime (manufactured by Idemitsu Kosan Co., Ltd.) was dissolved in 700 g of methyl ethyl ketone. 500 g of 1,3-bis(isocyanatomethyl)cyclohexane (cis, trans isomer mixture, manufactured by Mitsui Chemicals Inc., TAKENATE 600) was added dropwise thereto over 1 hour under ice-cooling, and the reaction was performed for another 1 hour after the dropwise addition. Thereafter, the temperature was raised to 40° C. and the reaction was performed for 1 hour. It was confirmed by ¹H-nuclear magnetic resonance (NMR) and high performance liquid chromatography (HPLC) that the reaction was completed to obtain a methyl ethyl ketone solution of a blocked isocyanate compound Q-1 (see the following formula).

<Synthesis of Blocked Isocyanate Compounds Q-2 to Q-4>

Methyl ethyl ketone solutions of blocked isocyanate compounds Q-2 to Q-4 (see the following formulae) were obtained with reference to the method of synthesizing the blocked isocyanate compound Q-1.

TABLE 2

| Blocked isocyanate compound | Structure |
|---|---|
| Q-1 | *[structure: bis-carbamate of 1,3-bis(aminomethyl)cyclohexane blocked with methyl ethyl ketoxime]* |
| Q-2 | *[structure: bis-carbamate of hexamethylenediamine blocked with methyl ethyl ketoxime]* |
| Q-3 | *[structure: bis-carbamate of m-xylylenediamine blocked with methyl ethyl ketoxime]* |
| Q-4 | *[structure: bis-carbamate of 2,4-toluenediamine blocked with methyl ethyl ketoxime]* |

<Preparation of Curable Composition>

Curable compositions A-1 to A-6 having compositions shown in Table 3 were prepared. In Table 3, a numerical value of each component represents the content (solid content mass) of each component. A curable composition was prepared by appropriately adding methyl ethyl ketone and 1-methoxy-2-propyl so that the content of methyl ethyl ketone in the solvent was 60% by mass and the concentration of solid contents was 25% by mass.

TABLE 3

| | | A-1 | A-2 | A-3 | A-4 | A-5 | A-6 |
|---|---|---|---|---|---|---|---|
| Polymerizable compound | Tricyclodecanedimethanol diacrylate (A-DCP, manufactured by Shin-Nakamura Chemical Co., Ltd.) | 17.90 | 17.90 | 17.90 | 17.90 | 17.90 | 17.90 |
| | Monomer having carboxy group ARONIX TO-2349 (manufactured by TOAGOSEI CO., LTD.) | 2.98 | 2.98 | 2.98 | 2.98 | 2.98 | 2.98 |
| | Urethane acrylate 8UX-015A (manufactured by Taisei Fine Chemical Co., Ltd.) | — | — | 10.72 | — | — | — |
| | A-NOD-N (manufactured by Shin-Nakamura Chemical Co., Ltd.) | 2.73 | 2.73 | — | 2.73 | 2.73 | 2.73 |
| | A-DPH (manufactured by Shin-Nakamura Chemical Co., Ltd.) | 7.99 | 7.99 | — | 7.99 | 7.99 | 7.99 |
| Polymer | P-100 | 52.67 | 52.67 | 52.67 | 52.67 | 52.67 | — |
| | P-101 | — | — | — | — | — | 52.67 |
| Photopolymerization initiator | 1-[9-Ethyl-6-(2-methylbenzoyl)-9H-carbazol-3-yl]ethanone 1-(O-acetyloxime) (OXE-02, manufactured by BASF) | 0.36 | — | 0.36 | 0.36 | 0.36 | 0.36 |
| | OXE03, manufactured by BASF | — | 0.36 | — | — | — | — |
| | 2-Methyl-1-(4-methylthiophenyl)-2-morpholinopropan-1-one (Irgacure 907, manufactured by BASF) | 0.73 | — | 0.73 | 0.73 | 0.73 | 0.73 |
| | 1-(Biphenyl-4-yl)-2-methyl-2-morpholinopropan-1-one (APi 307, manufactured by Shenzhen UV-ChemTech Co., Ltd.) | — | 0.73 | — | — | — | — |
| Blocked isocyanate compound | Q-1 | 12.50 | | | | | |
| | Q-2 | | 12.50 | | | | |

TABLE 3-continued

|  |  | A-1 | A-2 | A-3 | A-4 | A-5 | A-6 |
|---|---|---|---|---|---|---|---|
|  | Q-3 |  |  | 12.50 |  |  |  |
|  | Q-4 |  |  |  | 12.50 | 12.50 | 12.50 |
| Additive | N-phenylglycine (manufactured by Tokyo Chemical Industry Co., Ltd.) | 0.10 | 0.10 | 0.10 | 0.10 | 0.10 | 0.10 |
|  | 1,2,4-Triazole (manufactured by Otsuka Chemical Co., Ltd.) | — | 0.13 | — | — | — | — |
|  | Benzimidazole (manufactured by Tokyo Chemical Industry Co., Ltd.) | 0.13 | — | — | 0.13 | — | 0.13 |
|  | 5-Amino-1H-tetrazole (manufactured by Tokyo Chemical Industry Co., Ltd.) | — | — | 0.13 | — | — | — |
|  | Isonicotinamide (manufactured by Tokyo Chemical Industry Co., Ltd.) | 0.52 | 0.52 | 0.52 | 0.52 | 0.52 | 0.52 |
|  | SMA EF-40 (manufactured by TOMOEGAWA CO., LTD.) | 1.20 | 1.20 | 1.20 | 1.20 | 1.20 | 1.20 |
|  | MEGAFACE F551A (manufactured by DIC Corporation) | 0.19 | 0.19 | 0.19 | 0.19 | 0.19 | 0.19 |

A curable composition B-1 having composition shown in Table 4 was prepared.

TABLE 4

Composition B-1

| Component | (Part by mass) |
|---|---|
| Alicyclic epoxy compound (manufactured by Daicel Corporation, CELLOXIDE 2021P) | 98.62 |
| Photopolymerization initiator Irgacure 819 | 1.5 |
| Benzimidazole (manufactured by Tokyo Chemical Industry Co., Ltd.) | 0.13 |

A curable composition B-2 having composition shown in Table 5 was prepared.

The curable composition B-2 was a two liquid set of a liquid A and a liquid B.

TABLE 5

Composition B-2

|  | (Part by mass) |
|---|---|
| Liquid A |  |
| 1,6-Hexamethylene diisocyanate (TAKENATE 700 manufactured by Mitsui Chemicals Inc.) | 25.25 |
| Liquid B |  |
| Polypropylene oxide triol (MN-300 manufactured by Mitsui Chemicals Inc.) | 40.37 |
| Polyethylene glycol (Mw = 200, manufactured by Lion Specialty Chemicals Co., Ltd., PEG#200) | 34 |
| Reaction promoter (U-CAT102 manufactured by San-Apro Ltd.) | 0.5 |
| Benzimidazole (manufactured by Tokyo Chemical Industry Co., Ltd.) | 0.13 |

Production of Transfer Films of Examples 1 to 10 and Comparative Example 1

Any one of the curable compositions A-1 to A-6, B-1, or B-2 was applied onto LUMIRROR 16KS40 (thickness: 16 µm, manufactured by Toray Industries, Inc., polyethylene terephthalate film) which is a temporary support using a slit-shaped nozzle, and the solvent was volatilized in a drying zone at 100° C. to form a curable composition layer on the temporary support. The coating amount of the curable composition was adjusted to be the thickness of the organic film shown in Table 6. Next, a protective film (LUMIRROR 16KS40 (manufactured by Toray Industries, Inc.)) was pressure-bonded to the curable composition layer to produce each transfer film of Examples 1 to 10 and Comparative Example 1.

The protective film of each transfer film of Examples and Comparative Example was peeled off, and the exposed surface of the curable composition layer was brought into contact with the metal pattern of the film with a metal pattern and laminated (bonded) with each other so that the curable composition layer covered the metal pattern, thereby forming a laminate in which the curable composition layer and the temporary support were arranged on the film with a metal pattern.

The above-described lamination was performed under the conditions in which a temperature of the dielectric film was 40° C., a rubber roller temperature was 100° C., a linear pressure was 3 N/cm, and a transportation speed was 2 m/min, by using a vacuum laminator manufactured by MCK Co., Ltd.

Thereafter, the laminate was exposed through the temporary support using a proximity type exposure machine (manufactured by Hitachi High-Tech Electronics Engineering Co., Ltd.) including an ultra-high pressure mercury lamp with an exposure amount of 120 mJ/cm$^2$ (i-rays). A main wavelength of the exposure light at the time of irradiation was from light at a wavelength of 365 nm.

Thereafter, a post-baking treatment was performed at 145° C. for 30 minutes to form a laminate.

However, in a case where the composition B-2 was used, only the heating treatment at 145° C. for 30 minutes was performed without performing the above-described exposure treatment.

In Comparative Example 1, the above-described treatments were performed using a film on which the curable composition layer was not formed.

<Evaluation>
(Moisture Permeability)

According to the method described in JIS Z 0208, moisture permeability of a measurement sample in which five organic films of each of Examples and Comparative Example were laminated was measured (measurement conditions: temperature: 40° C., relative humidity: 90%, after 24 hours).

More specifically, the moisture permeability was calculated by the following method.

First, the measurement sample was produced by the following method. The transfer film of each of Examples and Comparative Example, which was produced on a commercially available Teflon (registered trademark) mesh, was laminated five times (temperature of transparent film substrate: 40° C., temperature of rubber roller: 110° C., linear pressure: 3 N/cm, transportation speed: 2 m/min). Thereafter, a distance between a surface of an exposure mask and the temporary support was set to 125 µm, and using a proximity type exposure machine (manufactured by Hitachi High-Tech Electronics Engineering Co., Ltd.) including an ultra-high pressure mercury lamp, the entire surface was exposed with an exposure amount of 100 mJ/cm$^2$ (i-rays) through the temporary support. Subsequently, the laminate was further subjected to a heating (post-baking) treatment at 150° C. for 60 minutes to form the measurement sample.

The obtained evaluation sample was allowed to stand at a temperature of 40° C. and a relative humidity of 90% for 24 hours, and then the moisture permeability was determined under the same conditions (temperature: 40° C., relative humidity: 90%) by the method described in JIS Z 0208. The value of the obtained moisture permeability was multiplied by 5 to obtain moisture permeability per one organic film.

The above-described operation was performed on five measurement samples to obtain five values of the moisture permeability per layer, and these numerical values were arithmetically averaged to obtain the moisture permeability (WVTR) of the present invention. The obtained moisture permeability (WVTR) was evaluated according to the following evaluation standard.

In a case where the composition B-2 was used, the above-described exposure treatment was not performed, and only the heating treatment at 145° C. for 30 minutes was performed to produce an evaluation sample.

A: WVTR was 1000 g/(m$^2$·24 hr) or less.
B: WVTR was more than 1000 g/(m$^2$·24 hr) and 2000 g/(m$^2$·24 hr) or less.
C: WVTR was more than 2000 g/(m$^2$·24 hr) and 3000 g/(m$^2$·24 hr) or less.
D: WVTR was more than 3000 g/(m$^2$·24 hr).

(Corrosiveness)

Salt water having a concentration of 50 g/L was dropped onto the surface of the laminate obtained in each of Examples and Comparative Example on the organic film side in 5 cm$^3$ and uniformly spread in 50 cm$^2$. Thereafter, moisture was evaporated at normal temperature, and the sample was subjected to a test using a HAST test device EHS-221MD (manufactured by ESPEC CORP.) in an environment at a temperature of 110° C. and a relative humidity of 85% for 32 hours. Thereafter, the salt water was wiped, and a surface state of the metal pattern in the laminate was observed and evaluated based on the following points.

A, B, and C are practically required levels.
A: there was no discoloration or roughness of copper or silver.
B: slight discoloration or roughness was observed in a part of copper or silver.
C: slight discoloration or roughness was observed on the entire surface of copper or silver.
D: discoloration or roughness was remarkably observed on the entire surface of copper or silver.

In Table 6, the column of "Film" indicates the type of the film with a metal pattern, in which "1" indicates the film 1 with a metal pattern and "2" indicates the film 2 with a metal pattern.

In Table 6, the column of "Heterocyclic compound" indicates whether or not the organic film contained the heterocyclic compound, in which "Y" indicates that the organic film contained the heterocyclic compound and "N" indicates that the organic film did not contain the heterocyclic compound.

In Table 6, the column of "Acid value" indicates whether the acid value of the polymer contained in the organic film was 20 mgKOH/g or less, in which "A" indicates 20 mgKOH/g or less and "B" indicates more than 20 mgKOH/g.

In Table 6, the column of "Thickness (µm)" indicates the thickness (µm) of the organic film.

TABLE 6

| | Film | Curable composition | Heterocyclic compound | Acid value | Thickness (µm) | Moisture permeability | Corrosiveness |
|---|---|---|---|---|---|---|---|
| Example 1 | 1 | A-1 | Y | A | 10 | A | A |
| Example 2 | 1 | A-2 | Y | A | 5 | A | A |
| Example 3 | 1 | A-3 | Y | A | 2 | C | B |
| Example 4 | 1 | B-1 | Y | A | 5 | A | A |
| Example 5 | 1 | B-2 | Y | A | 2 | C | B |
| Example 6 | 1 | A-1 | Y | A | 20 | A | A |
| Example 7 | 2 | A-1 | Y | A | 5 | A | A |
| Example 8 | 1 | A-4 | Y | A | 3 | B | B |
| Example 9 | 1 | A-5 | N | A | 3 | B | C |
| Example 10 | 1 | A-6 | Y | B | 3 | B | C |
| Comparative Example 1 | 1 | N | — | — | — | — | D |

As shown in Table 6, it was confirmed that the laminate according to the embodiment of the present invention exhibits a desired effect.

From the comparison between Examples 8 and 9, in a case where the organic film contained the heterocyclic compound, a more excellent effect was obtained.

From the comparison of Examples 8 and 10, in a case where the acid value of the polymer contained in the organic film was 20 mgKOH/g or less, a more excellent effect was obtained.

EXPLANATION OF REFERENCES 10, 20: laminate
12, 22: dielectric film
14: metal pattern
16: organic film
18, 18A: metal structure
24: first metal pattern
26: first organic film
28: second metal pattern
30: second organic film 32: first metal structure
34: second metal structure
40: photo mask
42: opening portion

What is claimed is:

1. A laminate comprising:
a dielectric film;
a metal pattern serving as a resonator with respect to electromagnetic waves in a terahertz band, which is disposed on at least one surface side of the dielectric film; and
an organic film in which a moisture permeability under an environment of a temperature of 40° C. and a relative humidity of 90% is 3000 g/(m²·24 hr) or less, which is disposed on the metal pattern, wherein the organic film is formed of a curable composition, and the curable composition contains a blocked isocyanate having a structure in which the isocyanate group is protected with a blocking agent, and wherein the curable composition further contains a binder polymer having a constitutional unit represented by Formula(S) and a constitutional unit represented by Formula (Cy),

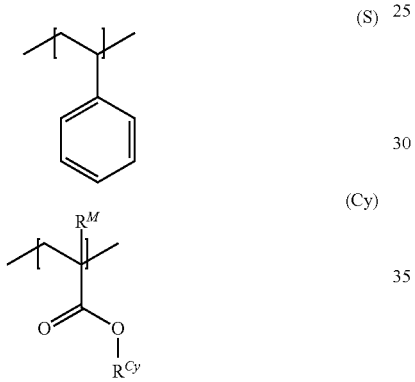

wherein, in Formula (Cy), $R^M$ represents a hydrogen atom or a methyl group, and $R^{Cy}$ represents a monovalent group having an aliphatic hydrocarbon ring structure.

2. The laminate according to claim 1, wherein the organic film contains a heterocyclic compound.

3. The laminate according to claim 1, wherein the organic film contains a polymer having an acid value of 20 mgKOH/g or less.

4. A laminate comprising:
a dielectric film;
a first metal pattern composed of a plurality of first metal structures, which is disposed on one surface side of the dielectric film;
a first organic film in which a moisture permeability under an environment of a temperature of 40° C. and a relative humidity of 90% is 3000 g/(m²·24 hr) or less, which is disposed on the first metal pattern;
a second metal pattern composed of a plurality of second metal structures, which is disposed on the other surface side of the dielectric film; and
a second organic film in which a moisture permeability under the environment of a temperature of 40° C. and a relative humidity of 90% is 3000 g/(m²·24 hr) or less, which is disposed on the second metal pattern,
wherein the first organic film and the second organic film are formed of a curable composition, and the curable composition contains a blocked isocyanate having a structure in which the isocyanate group is protected with a blocking agent, and wherein the curable composition further contains a binder polymer having a constitutional unit represented by Formula(S) and a constitutional unit represented by Formula (Cy),

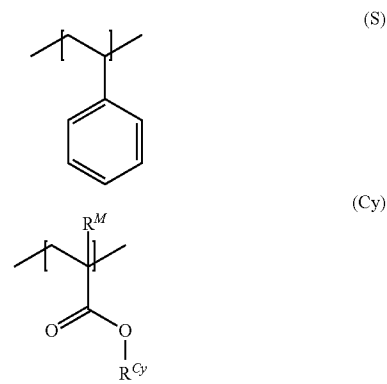

wherein, in Formula (Cy), $R^M$ represents a hydrogen atom or a methyl group, and $R^{Cy}$ represents a monovalent group having an aliphatic hydrocarbon ring structure, and
wherein the first metal pattern and the second metal pattern form a resonator with respect to electromagnetic waves in a terahertz band.

5. The laminate according to claim 4,
wherein, in a case where the laminate is seen in a plan view, at least a part of the first metal structure included in the first metal pattern and at least a part of the second metal structure included in the second metal pattern are arranged to be overlapped with each other.

6. The laminate according to claim 4,
wherein the first organic film and the second organic film contain a heterocyclic compound.

7. The laminate according to claim 4,
wherein the first organic film and the second organic film contain a polymer having an acid value of 20 mgKOH/g or less.

8. An optical element comprising:
the laminate according to claim 1.

9. A method for manufacturing a laminate, comprising:
a step 1A of bonding a film with a metal pattern, that includes a dielectric film and a metal pattern serving as a resonator with respect to electromagnetic waves in a terahertz band, which is disposed on at least one surface side of the dielectric film, to a transfer film including a temporary support and a curable composition layer to form a precursor film including the dielectric film, the metal pattern, the curable composition layer, and the temporary support in this order, wherein the curable composition layer contains a blocked isocyanate having a structure in which the isocyanate group is protected with a blocking agent, and wherein the curable composition layer further contains a binder polymer having a constitutional unit represented by Formula(S) and a constitutional unit represented by Formula (Cy),

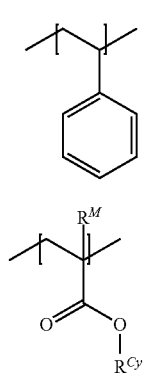

(S)

(Cy)

wherein, in Formula (Cy), $R^M$ represents a hydrogen atom or a methyl group, and $R^{Cy}$ represents a monovalent group having an aliphatic hydrocarbon ring structure; and a step 2A of subjecting the curable composition layer to a curing treatment to obtain an organic film in which a moisture permeability under an environment of a temperature of 40° C. and a relative humidity of 90% is 3000 g/(m²·24 hr) or less, wherein a step of peeling off the temporary support is further provided between the step 1A and the step 2A or after the step 2A.

10. The method for manufacturing a laminate according to claim 9, wherein the organic film contains a heterocyclic compound.

11. The method for manufacturing a laminate according to claim 9, wherein the organic film contains a polymer having an acid value of 20 mgKOH/g or less.

12. A method for manufacturing a laminate, comprising:

a step 1B of bonding a film with a metal pattern, that includes a dielectric film, a first metal pattern composed of a plurality of first metal structures, which is disposed on one surface side of the dielectric film, and a second metal pattern composed of a plurality of second metal structures, which is disposed on the other surface side of the dielectric film, where the first metal pattern and the second metal pattern form a resonator with respect to electromagnetic waves in a terahertz band, to a transfer film including a temporary support and a curable composition layer to form a precursor film including the temporary support, the curable composition layer, the first metal pattern, the dielectric film, the second metal pattern, the curable composition layer, and the temporary support in this order, wherein the curable composition layer contains a blocked isocyanate having a structure in which the isocyanate group is protected with a blocking agent, and wherein the curable composition layer further contains a binder polymer having a constitutional unit represented by Formula(S) and a constitutional unit represented by Formula (Cy),

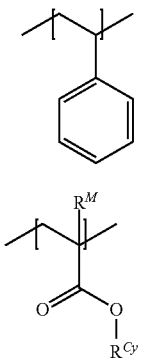

(S)

(Cy)

wherein, in Formula (Cy), $R^M$ represents a hydrogen atom or a methyl group, and $R^{Cy}$ represents a monovalent group having an aliphatic hydrocarbon ring structure; and a step 2B of subjecting the curable composition layers to a curing treatment to obtain organic films in which a moisture permeability under an environment of a temperature of 40° C. and a relative humidity of 90% is 3000 g/(m²·24 hr) or less, wherein a step 3B of peeling off the temporary supports is further provided between the step 1B and the step 2B or after the step 2B.

13. The method for manufacturing a laminate according to claim 12, wherein, in a case where the film with a metal pattern is seen in a plan view, at least a part of the first metal structure included in the first metal pattern and at least a part of the second metal structure included in the second metal pattern are arranged to be overlapped with each other.

14. The method for manufacturing a laminate according to claim 12, wherein the organic films contain a heterocyclic compound.

15. The method for manufacturing a laminate according to claim 12, wherein the organic films contain a polymer having an acid value of 20 mgKOH/g or less.

16. The laminate according to claim 2, wherein the organic film contains a polymer having an acid value of 20 mgKOH/g or less.

17. The laminate according to claim 1, wherein the blocked isocyanate has an isocyanurate structure.

18. The laminate according to claim 1, wherein a molar amount nS of the constitutional unit represented by Formula (S) and a molar amount nCy of the constitutional unit represented by Formula (Cy) in the binder polymer satisfy the relationship shown in the following expression (SCy):

$$0.2 \leq nS/(nS+nCy) \leq 0.8 \quad \text{Expression (SCy).}$$

19. The laminate according to claim 4, wherein the blocked isocyanate has an isocyanurate structure.

20. The laminate according to claim 4, wherein a molar amount nS of the constitutional unit represented by Formula (S) and a molar amount nCy of the constitutional unit represented by Formula (Cy) in the binder polymer satisfy the relationship shown in the following expression (SCy):

$$0.2 \leq nS/(nS+nCy) \leq 0.8 \quad \text{Expression (SCy).}$$

* * * * *